United States Patent
Yuda et al.

(10) Patent No.: US 6,848,755 B2
(45) Date of Patent: Feb. 1, 2005

(54) ACCUMULATOR

(75) Inventors: Akio Yuda, Shizuoka (JP); Toshiaki Kitahara, Shizuoka (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/333,870

(22) PCT Filed: Aug. 2, 2001

(86) PCT No.: PCT/JP01/06646

§ 371 (c)(1),
(2), (4) Date: Jul. 18, 2003

(87) PCT Pub. No.: WO02/12731

PCT Pub. Date: Feb. 14, 2002

(65) Prior Publication Data

US 2004/0056530 A1 Mar. 25, 2004

(30) Foreign Application Priority Data

| Aug. 9, 2000 | (JP) | 2000-240509 |
| Oct. 16, 2000 | (JP) | 2000-314555 |
| Jan. 12, 2001 | (JP) | 2001-004546 |
| May 11, 2001 | (JP) | 2001-141028 |

(51) Int. Cl.[7] ............................................. F15B 1/08
(52) U.S. Cl. ............................. 303/87; 138/30; 138/31
(58) Field of Search ........................ 138/30, 31; 303/87

(56) References Cited

U.S. PATENT DOCUMENTS

| 5,735,314 A | * | 4/1998 | Alaze et al. | 138/31 |
| 6,502,828 B1 | * | 1/2003 | Sasaki | 138/30 |
| 6,622,755 B2 | * | 9/2003 | Weber | 138/30 |

FOREIGN PATENT DOCUMENTS

| DE | 199 49 588 | 10/1999 |
| FR | 2 751 037 | 1/1998 |
| JP | 02-065701 | 5/1990 |
| JP | 09-242702 | 9/1997 |
| JP | 11-006572 | 1/1999 |
| JP | 2000-186767 | 7/2000 |
| JP | 2001-020901 | 1/2001 |

* cited by examiner

Primary Examiner—Matthew C. Graham
(74) Attorney, Agent, or Firm—Hogan & Hartson, LLP

(57) ABSTRACT

An accumulator (1) capable of suppressing a hydraulic pressure vibrating noise in the range of a sealed gas pressure or below and being reduced in size, wherein an operating member (5) having a bellows (6) is disposed in a housing (2) to partition the inside of the housing (2) into a pressure sealed chamber (8) and a pressure inflow chamber (9) and a fluid inlet (15) for leading pressure fluid from a system side to the pressure inflow chamber (9) is formed in the end wall part (3a) of the housing (2), a chamber forming member (17) is fixed to the inside of the housing (2), and a chamber (18) and a choke (19) are provided between the chamber forming member (17) and the end will part (3a) of the housing (2).

8 Claims, 15 Drawing Sheets

ACCUMULATOR

TECHNICAL FIELD PERTINENT TO THE INVENTION

The present invention relates to an accumulator used as a pressure accumulating apparatus, a pulse damping apparatus or the like.

PRIOR ART

For example, a hydraulic system of the brake or suspension related mechanism of a vehicle (passenger car, truck and the like) has adopted a metallic accumulator for the purpose of pressure accumulation (compensation for pump capacity or the like), pulse damping or the like. Usually, the region in which this accumulator functions is a hydraulic range above the point A in a graph of FIG. 17. Therefore, the hydraulic range below the point A is equivalent to a condition in which no accumulator exists.

As a problem for the vehicle which often occurs in the range below the point A, occurrence of hydraulic noise due to system resonance or the like by pump exhausting vibration can be mentioned. A conventional accumulator cannot suppress this hydraulic vibration sound but cope with this sound by providing its hydraulic circuit with a complicated structure. Therefore, it costs a great deal to reduce this vibrating sound.

To solve this problem, recently an accumulator 51 shown in FIG. 18 has been developed so as to suppress the aforementioned vibrating sound by vibration damping action of a chamber 53 and a constriction 54 which are provided inside a housing 52 of this accumulator 51. However, because the chamber 53 and the constriction 54 are provided inside an end member (called bellows cap also) which constitutes an operating member 5 of the accumulator 51 with a bellows 56, the bellows 56 internally filled with gas needs to have a large volume and therefore, there is such an inconvenient problem that the accumulator 51 has been enlarged. Further, because the chamber 53 is formed by welding a chamber forming member 58 to the end member 57, the welded portion of the accumulator 51 increases, thereby complicating the manufacturing process of the accumulator 51.

PROBLEM TO BE SOLVED BY THE INVENTION

In views of the above-described problems, an object of the present invention is to provide an accumulator which can suppress hydraulic vibration sound in a range below the sealed gas pressure in the accumulator and reduce the size of the accumulator. Another object of the present invention is to provide an accumulator which blocks an increase of welded portions therein and which is relatively easy to manufacture. Still, another object of the present invention is to provide an accumulator capable of preventing a bellows from being expanded and damaged due to a difference in pressure between the inside and the outside of the bellows when system pressure drops below the sealed gas pressure.

MEANS FOR SOLVING THE PROBLEM

To achieve the above object, according to claim 1 of the present invention, there is provided an accumulator in which an operating member including a bellows is disposed inside a housing so as to partition the interior of the housing into a pressure sealing chamber and a pressure flow-in chamber while an end wall portion of the housing is provided with a fluid inlet for introducing a pressurized fluid from the system side into the pressure flow-in chamber, a chamber forming member being fixed inside the housing so that a chamber and a constriction are provided between the chamber forming member and an end wall portion of the housing.

The feature of the accumulator according to claim 2 of the present invention is that the chamber forming member is fixed to the housing by non-welding means such as fitting, press-fitting, caulking.

The feature of the accumulator according to claim 3 of the present invention is that the chamber forming member is fixed to the housing by a convex loosening stopper portion provided on an inner face of the housing.

The feature of the accumulator according to claim 4 is that the chamber forming member is fixed to the housing by such a loosening stopper member as a stopper ring fixed to the inner face of the housing.

The feature of the accumulator according to claim 5 of the present invention is that the chamber forming member is fixed to the housing by inserting the chamber forming member to the outer periphery of an insertion fixing portion provided on the housing.

The feature of the accumulator according to claim 6 of the present invention is that the chamber forming member is fixed to the housing by inserting the chamber forming member to the outer periphery of the insertion fixing portion provided on the housing and deforming a front end portion of the insertion fixing portion after the insertion.

The feature of the accumulator according to claim 7 of the present invention is that the chamber forming member is provided with an elastic seal which the operating member contacts or leaves when it is operated.

The feature of the accumulator according to claim 8 of the present invention is that three components, namely, a shell forming the housing, an end member and a bellows holder holding the bellows are assembled together by welding.

Because the accumulator 1 according to claim 1 of the present invention having the above-described structure has the chamber and the constriction within its housing, the aforementioned hydraulic noise can be suppressed by this chamber, constriction and vibration damping action. Further, because these chamber and constriction are not operating members unlike in the conventional technology but exist between the chamber forming member fixed inside the housing and the end wall portion of the housing provided with the fluid inlet, a bellows having so large a volume does not need to be employed. Because, if the chamber is provided between the chamber forming member and the end wall portion of the housing, the entire inner diameter of the housing can be employed for formation of the chamber, the height (dimension in the axial direction) of the housing can be suppressed to a relatively small value.

Additionally, because in the accumulator according to claim 2 of the present invention having the above-described structure, the chamber forming member is fixed to the housing not by welding unlike in the conventional technology but by non-welding means such as fitting, press-fitting, caulking, the quantity of its welded portions does not increase even if the chamber is provided within the housing.

Further, because in the accumulator according to claim 3 of the present invention having the above-described structure, the chamber forming member is fixed to the housing not by welding unlike in the conventional technology but by the convex loosening stopper engaging portion provided on the inner face of the housing, the quantity of its welded portions does not increase even if the chamber is provided within the housing.

Further, because in the accumulator according to claim 4 of the present invention having the above-described structure, the chamber forming member is fixed to the housing not by welding unlike in the conventional technology but by such a loosening stoppage member as the stopper ring fixed on the inner face of the housing, the quantity of its welded portions does not increase even if the chamber is provided within the housing.

Further, because in the accumulator according to claim 5 of the present invention having the above-described structure, the chamber forming member is fixed to the housing not by welding unlike in the conventional technology but by fitting the chamber forming member into the outer periphery of the insertion fixing portion provided on the housing, the quantity of its welded portions does not increase even if the chamber is provided within the housing.

Further, because in the accumulator according to claim 6 of the present invention having the above-described structure, the chamber forming member is fixed to the housing not by welding but by inserting the chamber forming member to the outer periphery of the insertion fixing portion provided on the housing and after the insertion, deforming the front end portion of the insertion fixing portion by bending, caulking, crushing or the like, the quantity of its welded portions does not increase even if the chamber is provided within the housing.

Further, because in the accumulator according to claim 7 of the present invention, the chamber forming member is provided with the elastic seal which the operating member contacts or leaves upon its operation, the sealing action of this elastic seal can maintain the pressure in the pressure flow-in chamber over a predetermined value even if the pressure in the pressure flow-in chamber or the pressure on the system side drops below the sealing gas pressure. Preferably, the elastic seal is formed integrally with the chamber forming member made of steel from viewpoints of handling components.

Further, because in the accumulator according to claim 8 of the present invention having the above-described structure having the above-described structure, the three components, namely, the shell forming the housing, the end member and the bellows holder holding the bellows are assembled together by welding, the welding operation for these components can be achieved all at once, thereby leading to facilitation of the assembly work.

This proposal contains the following technical matters.

A problem to be solved by this proposal is to provide the accumulator with the function of absorbing hydraulic vibration sound (for example, hydraulic noise) within a range below the charged gas pressure in the accumulator by forming an appropriate chamber on the side of a hydraulic pressure chamber within the accumulator. Another problem is to provide the accumulator with the function of absorbing medium to high frequency vibrations within a hydraulic range below the charged gas pressure by forming the chamber and constriction within the chamber so as to combine compression characteristic of oil with constriction effect. Consequently, the vibration sound generated in the hydraulic system is suppressed at low cost.

To solve the above-described problems, an accumulator according to this proposal is a metallic bellows accumulator containing a chamber, which ensures the following features. That is, a plate which constitutes the chamber and a double seal (lip seal, main and reserve) for securing reliability are composed of a baked-rubber integral component and this is held and fixed by caulking the shell. Consequently, the formation of the chamber and fixing of two seals are carried out at the same time, thereby realizing light weight, compact structure and low cost.

Further, by using the entire inner diameter of the shell below the seal, the height of the chamber is reduced and the chamber can be formed easily by press-fitting the seal.

Additionally, by providing the chamber in a dead space in the oil port of the shell, the shell and accumulator are entirely formed in a compact style.

BEST MODE FOR CARRYING OUT THE INVENTION

Next, the embodiments of the present invention will be described with reference to the accompanying drawings.

First Embodiment

FIG. 1 shows a section of the accumulator 1 according to a first embodiment of the present invention and FIG. 2 shows an enlargement diagram of its main portion.

The accumulator 1 of this embodiment is a metallic bellows type accumulator and has the following structure.

First, a housing 2 is provided by fixing a lid member (called gas end cover also) to an open end portion of a bottomed cylindrical shell 3 (by carbon dioxide laser welding) and an operating member 5 having a bellows 6 and an end member (called bellows cap also) 7 is accommodated inside this housing 2.

An end portion of the bellows 6 is fixed to the lid member 4 (by TIG welding) while the other end thereof is fixed to the end member 7 (by TIG welding). The interior of the housing 2 is partitioned by the bellows 6 and the end member 7 to a pressure sealing chamber (called gas chamber also) 8 inside the bellows 6 and the end member 7 and a pressure flow-in chamber (called liquid chamber or hydraulic chamber also) 9 outside the pressure sealing chamber.

Although an electro-deposited bellows, a molded bellows or a metallic bellows such as a welded bellows is employed as the bellows 7, it is permissible to use a bellows made of other materials depending on the specification and application purpose of the accumulator 1. Further, the end member 7 may be formed integrally with the bellows 6.

The lid member 4 which constitutes part of the aforementioned housing 2 is provided with a pressure supply port 10 for supplying gas into the pressure sealing chamber 8, and a plug member (called gas plug also) 11 for closing this supply port 10 is attached to this supply port 10 and this plug member is covered with a hexagon nut 12. For the reason, before the plug member 11 and the hexagon nut 12 are fixed, gas under a predetermined pressure is supplied into the sealing chamber 8 through the supply port 10 and after the gas is supplied, the plug member 11 and the hexagon nut 12 are fixed (by projection welding), so that gas of the predetermined pressure is charged in the sealing chamber 8. As for the kind of the charged gas, preferably, nitrogen gas or the like is employed. An end wall portion 3a of the shell 3 which constitutes part of the housing 2 is provided with a cylindrical mounting portion 13 having a thread portion 14 for connecting the accumulator 1 to a pressure pipe or the like of a hydraulic system side (not shown). This mounting portion 13 has a fluid inlet (called pressure introduction port or fluid passage also) 15 for introducing pressure fluid (brake fluid) on the system side into the pressure flow-in chamber 9. Therefore, the accumulator 1 is connected to the system side through the mounting portion 13, so that the pressure on the system side is introduced from the flow-in port 15 into the flow-in chamber 9.

Further, an annular sliding member (called vibration damping ring also) is mounted on the outer peripheral side of the other end portion of the bellows 6 fixed to the end member 7 or the outer peripheral side of the end member 7. When the end member 7 moves while the bellows 6 is expanded or contracted, this sliding member 16 slides on the inner peripheral face of the shell 3 through its outer peripheral portion. Thus, a guide by sliding of this sliding member 16 moves the end member 7 in parallel to the inner peripheral face of the shell 3 so that the bellows 6 is expanded or contracted in parallel to the inner peripheral face of the shell 3. This prevents the end member 7 or the bellows 6 from being caught by the inner peripheral face of the shell 3. In the meantime, this sliding member 16 has a pressure communicating portion (not shown), which prevents the pressure flow-in chamber 9 from being separated into a space 9a on the side of an outer periphery of the bellows 6 and a space 9b below the end member 9a in the same Figure by the sliding member 16.

The chamber forming member (called seal plate also) 17 is fixed on the inner side of the end wall portion 3a of the shell 3 inside the housing 2 and a chamber 18 and a constriction (called nozzle or orifice also) 19 are provided between the chamber forming member 17 and the end wall portion 3a of the shell 3. The chamber forming member 17 has an elastic seal 20 which the end member 7 of the operating member 5 contacts or leaves when it is activated.

The chamber forming member 17 is formed of a predetermined metal to an annular shape and composed of an inner cylindrical portion 17a, an inner flat portion 17b which is formed integrally from an end portion of this inner cylindrical portion 17a on the side of the end wall portion 3a, an outer cylindrical portion 17c which is formed integrally from an outer peripheral end portion of the inner flat portion 17b toward the end member 7 and an annular outer flat portion 17d which is formed integrally from an end portion of the outer cylindrical portion 17c on the side of the end member 7 outward in the diameter direction. By caulking the outer periphery of a step portion 3b in the shell 3 with the inner flat portion 17b being in contact with the inner face of the end wall portion 3a of the shell 3 while the outer peripheral end portion of the outer flat portion 17d being in contact with the annular step portion 3b provided in the outer periphery of the end wall portion 3a of the shell 3, this chamber forming member 17 is fixed to the shell 3. In the same Figure, reference numeral 3c indicates the caulking portion. A space on the side of the inner periphery of the inner cylindrical portion 17a acts as a communicating portion 21 which communicates between the pressure flow-in chamber 9 and the fluid inlet 15.

The chamber 18 is formed as an annular space defined by the outer cylindrical portion 17c and the outer flat portion 17d of the chamber forming member 17 and the end wall portion 3a of the shell 3, and its volume is set to, for example, about 10 cc.

The constriction 19 is provided in the inner face of the end wall portion 3a of the shell 3 in the form of a groove or notch so as to secure communication between the fluid inlet 15 and the chamber 18 and a predetermined number thereof are provided radially (for example, distributed equally in four directions).

The elastic seal 20 is composed of a lip-like inner peripheral seal 22 and an outer peripheral seal 23, formed of predetermined rubber-like elastic material and both seals 22, 23 are constructed in the following way.

First, the inner peripheral seal 22 is bonded by an annular space 17e, surrounded by inner faces of the inner cylindrical portion 17a, the inner flat portion 17b and the outer cylindrical portion 17c of the chamber forming member 17 and has a double-structure lip end 22a which the end member 7 of the operating member 5 contacts or leaves when it is operated.

The outer peripheral seal 23 is bonded by vulcanization to an end face of the outer flat portion 17 on the side of the end member 7 of the chamber forming member 17 and has a triple structure lip end 23a which the end member 7 of the operating member 5 contacts or leaves when it is operated.

Film portion 24 is bonded by vulcanization on the end face on the side of the end member 7 of the outer flat portion 17d, the outer peripheral face and the end face on the side of the end wall portion 3a as part of the outer peripheral seal 23, so that this film portion 24 seals the space between the chamber forming member 17 and the shell 3.

If pressure fluid with vibration on the system side flows into the accumulator having the above described structure, when this fluid or its pressure passes or propagates through the constriction 19, vibration energy is converted to loss energy due to contracted flow/throttling. Further when fluid reaches the chamber 18, it is used and consumed as dynamic loss. Therefore, vibration such as the aforementioned noise can be suppressed by the vibration damping action by the chamber 18 and the constriction 19.

The chamber 18 and the constriction 19 are not the operating members 5 unlike in the aforementioned conventional technology and are provided between the chamber forming member 17 fixed inside the shell 3 of the housing 2 and the end wall portion 3a of the shell 3. Therefore, a bellows 6 having as large a volume as in the conventional technology does not need to be used. To define the shell 18, the entire inner diameter of the shell 3 can be used as shown in the Figure and thus, the heights of the shell 3 and the housing 2 can be suppressed to relatively small ones. For the reason, the entire accumulator 1 can be formed smaller than in the conventional technology.

Further, the chamber forming member 17 is fixed to the shell 3 of the housing 2 not by welding but by caulking unlike in the conventional technology. Thus, the welded portions in the accumulator 1 do not increase although the accumulator 1 is provided additionally with the chamber forming member 17. Thus, the accumulator 1 can be manufactured more easily than in the conventional technology.

Because the elastic seal 20 which the operating member 5 contacts or leaves when it is operated is provided on the chamber forming member 17, even if the pressure in the pressure flow-in chamber 9 or the pressure on the system side drops below a charged gas pressure when the accumulator 1 is actuated, the pressure of the pressure flow-in chamber 9 can be maintained over a predetermined value by the sealing action of the elastic seal 17. Thus, the bellows 6 can be prevented from being expanded or damaged due to a difference in pressure between the inside and the outside. The elastic seal 20 ensures high safety and reliability because it is composed of the inner peripheral seal and the outer peripheral seal so that a double structure is formed. Further, because this elastic seal 20 is formed integrally with the chamber forming member 17 by vulcanization, the chamber forming member 17 and the elastic seal 20 can be handled as a single component.

According to the present invention, the fixing means for fixing the chamber forming member 17 to the housing 2 is not restricted to the above-described caulking, but other non-welding means such as fitting, press fitting may be employed or it is permissible to combine these methods. FIG. 3 shows its example, in which the fixing structure is constructed as follows.

Second Embodiment

A third cylindrical portion 17f is formed integrally on an outer peripheral end portion of the outer flat portion 17d of the chamber forming member 17 of the first embodiment such that it is directed toward the end wall portion 3a. The chamber forming member 17 is press-fit through this third cylindrical portion 17f against the end wall portion 3a of the shell 3 of the housing 2 and caulked by the shell 3. The inner peripheral seal 22 and the outer peripheral seal 23 are made continuous by the film portion 25 formed integrally between the both seals 22 and 23. According to this embodiment, because the outer peripheral portion of the chamber forming member 17 is positioned and held with respect to the shell 3 by the third cylindrical portion 17f, the step portion 3b does not need to be provided in the end wall portion 3a of the shell 3 unlike in the first embodiment.

Third Embodiment

FIG. 4 shows the section of an accumulator 1 according to the third embodiment of the present invention and FIG. 5 shows an enlargement diagram of its major components.

The accumulator 1 of this embodiment is a metallic bellows type accumulator, which has the following structure.

First, a housing 2 is provided by fixing (welding) a lid member (called gas end cover also) 4 to the open end portion 3a of a bottomed cylindrical shell 3 and further fixing a port member (called oil port also) 31 to the center of the flat face of the end wall portion 3a of the shell. An operating member 5 composed of a bellows holder 32, a bellows 6 and an end member (called bellows cap also) 7 is accommodated within this housing 2.

The bellows holder 32 is fixed (welded) to inner faces of the shell 3 and the lid member 4 and an end portion of the bellows 6 is fixed (welded) to the bellows holder 32 while the other end thereof is fixed (welded) to the end member 7. Consequently, the interior of the housing 2 is partitioned by the bellows holder 32, the bellows 6 and the end member 7 to a pressure sealing chamber (called gas chamber also) 8 which is formed inside the bellows holder 32, the bellows 6 and the end member 7, and a pressure flow-in chamber (called liquid chamber or hydraulic chamber also) 9 outside those components.

Although an electro-deposited bellows, a molded bellows or a metallic bellows such as a welded bellows is employed as the bellows 7, it is permissible to use a bellows made of other materials depending on the specification and application purpose of the accumulator 1. Further, the end member 7 may be formed integrally with the bellows 6.

The lid member 4 which constitutes part of the aforementioned housing 2 is provided with a pressure supply port 10 for supplying gas into the pressure sealing chamber 8, and a plug member (called gas plug also) 11 for closing this supply port 10 is attached to this supply port 10 and this plug member is covered with a hexagon nut 12. For the reason, before the plug member 11 and the hexagon nut 12 are fixed, gas of a predetermined pressure is supplied into the sealing chamber 8 through the supply port 10 and after the gas is supplied, the plug member 11 and the hexagon nut 12 are fixed (welded), so that gas of the predetermined pressure is charged in the sealing chamber 8. As for the kind of the charged gas, nitrogen gas or the like is preferable.

A port member 31, which constitutes part of the housing 2 is provided with a cylindrical mounting portion 13 having a thread portion 14 for connecting the accumulator 1 to a pressure pipe or the like of a hydraulic system side (not shown). This mounting portion 13 has a fluid inlet (called pressure introduction port or fluid passage also) 15 for introducing pressure fluid (brake fluid) on the system side into the pressure flow-in chamber 9. Therefore, the actuator 1 is connected to the system side through the mounting portion 13, so that the pressure on the system side is introduced from the flow-in port 15 into the flow-in chamber 9.

Further, an annular sliding member (called vibration damping ring also) 16 is mounted on the outer peripheral side of the other end portion of the bellows 6 fixed to the end member 7 or the outer peripheral side of the end member 7. When the end member 7 moves while the bellows 6 is expanded or contracted, this sliding member 16 slides on the inner peripheral face of the shell 3 through its outer peripheral portion. Thus, a guide by sliding of this sliding member 16 moves the end member 7 in parallel to the inner peripheral face of the shell 3 so that the bellows 6 is expanded or contracted in parallel to the inner peripheral face of the shell 3. This prevents the end member 7 or the bellows 6 from being caught by the inner peripheral face of the shell 3. In the meantime, this sliding member 16 has a pressure communicating portion (not shown), which prevents the pressure flow-in chamber 9 from being separated into a space 9a on the side of an outer periphery of the bellows 6 and a space 9b below the end member 9a in the same Figure by the sliding member 16.

The chamber forming member (called seal plate also) 17 is fixed on the inner sides of the end wall portion 3a of the shell 3 and the port member 31 inside the housing 2 and a chamber 18 and a constriction (called nozzle or orifice also) 19 are provided between the chamber forming member 17, the end wall portion 3a of the shell 3 and the port member 31.

The chamber forming member 17 is provided with an elastic seal (called first elastic seal) 20 which the end member 7 of the operating member 5 contacts or leaves. Likewise, the chamber forming member 17 is also provided with a second elastic seal 33, which seals the space between the chamber forming member 17 and the shell 3.

The chamber forming member 17 is formed of a predetermined metal to an annular shape and composed of an inner cylindrical portion 17a, an inner flat portion 17b which is formed integrally from an end portion of this inner cylindrical portion 17a on the side of the end wall portion 3a, an outer cylindrical portion 17c which is formed integrally from an outer peripheral end portion of the inner flat portion 17b toward the end member 7, an annular outer flat portion 17d which is formed integrally from an end portion of the outer cylindrical portion 17c on the side of the end member 7 outward in the diameter direction and a third cylindrical portion 17f which is formed integrally from an outer peripheral end portion of the outer flat portion 17d toward the end wall portion 3a. This chamber forming member 17 is fixed to the shell 3 such that the bottom face of the inner flat portion 17b and the bottom end face of the third cylindrical portion 17f are made in contact with inner faces of the port member 31 and the end wall portion 3a. The fixing structure will be described later. A space on the side of the inner periphery of the inner cylindrical portion 17a acts as a communicating portion 21 which communicates between the pressure flow-in chamber 9 and the fluid inlet 15.

The chamber 18 is formed as an annular space defined by the outer cylindrical portion 17c, the outer flat portion 17d and the third cylindrical portion 17f of the chamber forming member 17, the end wall portion 3a of the shell 3 and the port member 31.

The constriction 19 is provided in the inner face of the port member 31 in the form of a groove or notch so as to secure communication between the fluid inlet 15 and the chamber 18 and a predetermined number thereof are provided radially (for example, distributed equally in four directions).

The elastic seal 20 is composed of a lip-like inner peripheral seal (called first seal also) 22 and an outer peripheral seal (called second seal also) 23, formed of predetermined rubber-like elastic material and both seals 22, 23 are constructed in the following way.

First, the inner peripheral seal 22 is bonded by vulcanization to inner faces of the annular space 17e surrounded by the inner cylindrical portion 17a, the inner flat portion 17b and the outer cylindrical portion 17c of the chamber forming member 17 and has a double-structure lip end 22a which the end member 7 of the operating member 5 contacts or leaves when it is operated.

The outer peripheral seal 23 is bonded by vulcanization to an end face of the outer flat portion 17 on the side of the end member 7 of the chamber forming member 17 and has a double structure lip end 23a which the end member 7 of the operating member 5 contacts or leaves when it is operated.

The second elastic seal 33 is composed of combination of a lip-like third seal 34 and fourth seal (called outer peripheral rubber portion also) 35 formed of a predetermined rubber-like elastic material and both seals 34, 35 are constructed in the following way.

The third seal 34 is bonded by vulcanization on an outer peripheral edge of an end face on the side of the end member 7 of the outer flat portion 17d of the chamber forming member 17 and has a lip end which always makes contact with an inner face of a peripheral wall portion 3d of the shell 3.

The fourth seal 35 is bonded by vulcanization on the outer peripheral face of the third cylindrical portion 17f of the chamber forming member 17 and has a lip end which always makes contact with the inner face of the peripheral wall portion 3d of the shell 3.

In the elastic seal 20 and the second elastic seal 33, the inner peripheral seal 22 and the outer peripheral seal 23 are formed integrally through the film portion 25, and the outer peripheral seal 23 and the third seal 34 are formed integrally through the film portion 36. Further, the third seal 34 and the fourth seal 35 are also formed integrally through the film portion 37. Thus, all of the inner peripheral seal 22, the outer peripheral seal 23, the third seal 34 and the fourth seal 35 are formed integrally, so that the elastic seal 20 and the second elastic seal 33 are also formed integrally.

When the chamber forming member 17 on which the elastic seal 20 and the second elastic seal 33 are bonded by vulcanization is pressed into the shell 3, the chamber forming member 17 is fixed to the inner face of the shell 3 by a pressed distance produced by compressing the fourth seal 35 of the second elastic seal 33 bonded by vulcanization to the outer peripheral face of the third cylindrical portion 17f in the diameter direction. By forming a convex loosening stopper engaging portion 3e at the middle portion between the third seal 34 and the fourth seal 35 on the inner peripheral face of the peripheral wall portion 3d of the shell 3 before press-in, the fourth seal rides over this loosening stopper engaging portion 3e upon the press-in, so that the fourth seal 35 engages this loosening stopper engaging portion 3e after the press-in, thereby fixing the chamber forming member 17 to the shell 3 so as to prohibit from loosening.

The convex loosening stopper engaging portion 3e is formed by deforming the peripheral wall portion 3d of the shell 3 partially in the diameter direction to make a concave portion 3f in the outer peripheral face and preferably, the size (depth) of the concave portion 3f is 0.2–0.5 mm. If the shell 3 is drawn by transfer, the concave portion 3f is formed in the shell 3 at the final of this transfer.

This convex loosening stopper engaging portion 3e may be formed after the chamber forming member 17 is pressed in.

If pressure fluid with vibration on the system side flows into the accumulator having the above described structure, when this fluid or its pressure passes or propagates through the constriction 19, vibration energy is converted to loss energy due to contracted flow/throttling. Further, when fluid reaches the chamber 18, it is used and consumed as dynamic loss. Therefore, vibration such as the aforementioned noise can be suppressed by the vibration damping action by the chamber 18 and the constriction 19.

Further, because the chamber 18 and the constriction 19 are formed not in the operating member 5 unlike in the conventional technology but among the chamber forming member 17 fixed inside the shell 3 and the port member 31 of the housing 2, the end wall portion 3a of the shell 3 and the port member 31, a bellows 6 having as large a volume as the conventional technology does not need to be used. To define the shell 18, the entire inner diameter of the shell 3 can be used as shown in the Figure and thus, the heights of the shell 3 and the housing 2 can be suppressed to relatively small ones. For the reason, the entire accumulator 1 can be formed smaller than in the conventional technology.

Further, the chamber forming member 17 is fixed to the shell 3 of the housing 2 not by welding but by press-in and engagement with the loosening stopper portion 3e unlike in the conventional technology. Thus, the welded portions in the accumulator 1 do not increase although the accumulator 1 is provided additionally with the chamber forming member 17. Thus, the accumulator 1 can be manufactured more easily than in the conventional technology. Because the elastic seal 20 which the operating member 5 contacts or leaves upon its operation is provided on the chamber forming member 17, even if the pressure in the pressure flow-in chamber 9 or the pressure on the system side drops below the charged gas pressure when the accumulator 1 is actuated, the pressure of the pressure flow-in chamber 9 can be maintained over a predetermined value by the sealing action of the elastic seal 17. Thus, the bellows 6 can be prevented from being expanded or damaged due to a difference in pressure between the inside and the outside. The elastic seal 20 ensures high safety and reliability because it is composed of the inner peripheral seal and the outer peripheral seal so that a double structure is formed. Further, because this elastic seal 20 is formed integrally with the chamber forming member 17 by vulcanization, the chamber forming member 17 and the elastic seal 20 can be handled as a single component.

The fixing method for the chamber forming member 17 to the housing 2 according to present invention is not restricted to the above-described press-fitting and engagement with the loosening stopper engaging portion 3e and may be of the following style. Further it may be a combination of these methods. FIGS. 6 and 7 show fixing structures which will be described below as examples.

Fourth Embodiment

In the accumulator shown in FIG. 6, by caulking an intermediate portion of the peripheral wall portion 3d of the shell 3 between the third seal 34 and the fourth seal 35 after the chamber forming member 17 is press-fit to the shell 3, the convex loosening stopper engaging portion 3e is formed, so that the chamber forming member 17 is fixed to the shell 3 thereby prohibiting from loosening.

Fifth Embodiment

In the accumulator shown in FIG. 7, a step portion 3g is provided preliminarily at the intermediate portion of the inner peripheral face of the peripheral wall portion 3d of the shell 3 between the third seal 34 and the fourth seal 35. After the chamber forming member 17 is press-fit to the shell 3, a stopper ring 38 is fixed to this step portion 3g by fitting or the like so that the chamber forming member 17 is fixed to the shell 3, thereby prohibiting from loosening.

Sixth Embodiment

FIG. 8 shows a section of the accumulator 1 according to the sixth embodiment of the present invention and FIG. 9 shows an enlarged diagram of its major components.

The accumulator 1 of this embodiment is a metallic bellows type accumulator and has the following structure.

First, a lid member (called gas end cover or upper shell also) 4 is fixed to an open end portion (top end portion in the same Figure) of a bottomed cylindrical shell (called lower shell also) (by carbon dioxide laser welding or electron beam welding) and a port member (called oil port or poppet) 31 is fixed to the center of a flat face of the end wall portion 3a of the shell 3 (by TIG welding or plasma welding), so that the housing 2 is formed of these components. This housing 2 accommodates the operating member 5 composed of the bellows holder (called holder also) 32, the bellows 6, the end member (called bellows cap also) 7 and a spacer 39.

The bellows holder 32 is fixed to inner faces of the shell 3 and the lid member 4 (by carbon dioxide laser welding or electron beam welding) and an end portion of the bellows 6 is fixed to the bellows holder 32 (by TIG welding) while the other end thereof is fixed to the end member 7 (by TIG welding). Consequently, the interior of the housing 2 is partitioned by a bellow assembly composed of the bellows holder 32, the bellows 6 and the end member 7 to the pressure sealing chamber (called gas chamber also, gas volume: for example 120 cm$^3$) 8 inside these components and the pressure flow-in chamber (called liquid chamber or hydraulic chamber also, zero-down charged fluid: for example, 50 cc) 9 outside these components. Preferably, these three components, namely, the bellows holder 32, the shell 3 and the lid member 4 (bellows assembly) are not welded separately, but assembled together at the same time by laser welding or beam welding (EBW).

Although an electro-deposited bellows, a molded bellows or a metallic bellows such as a welded bellows is employed as the bellows 7, it is permissible to use a bellows made of other materials depending on the specification and application purpose of the accumulator 1. Further, the end member 7 may be formed integrally with the bellows 6.

The lid member 4 which constitutes part of the aforementioned housing 2 is provided with a pressure supply port 10 for supplying gas into the pressure sealing chamber 8, and a plug member (called gas plug also) 11 for closing this supply port 10 is attached to this supply port 10 and this plug member is covered with a hexagon nut 12. For the reason, before the plug member 11 and the hexagon nut 12 are fixed, gas under a predetermined pressure is supplied into the sealing chamber 8 through the supply port 10 and after the gas is supplied, the plug member 11 and the hexagon nut 12 are fixed (by projection welding), so that gas of the predetermined pressure is charged in the sealing chamber 8. As for the kind of the charged gas, preferably, nitrogen gas or the like is employed. The port member 31 which constitutes part of the housing 2 is provided with a cylindrical mounting portion 13 having a thread portion 14 for connecting the accumulator 1 to a pressure pipe or the like of a hydraulic system side (not shown). This mounting portion 13 has a fluid inlet (called pressure introduction port or fluid passage also) 15 for introducing pressure fluid (brake fluid) on the system side into the pressure flow-in chamber 9. Therefore, the accumulator 1 is connected to the system side through the mounting portion 13, so that pressure on the system side is introduced from the flow-in port 15 into the flow-in chamber 9. Further, an annular sliding member (called vibration damping ring also) 16 is mounted on the outer peripheral side of the other end portion of the bellows 6 fixed to the end member 7 or the outer peripheral side of the end member 7. When the end member 7 moves while the bellows 6 is expanded or contracted, this sliding member 16 slides on the inner peripheral face of the shell 3 through its outer peripheral portion. Thus, a guide by sliding of this sliding member 16 moves the end member 7 in parallel to the inner peripheral face of the shell 3 so that the bellows 6 is expanded or contracted in parallel to the inner peripheral face of the shell 3. This prevents the end member 7 or the bellows 6 from being caught by the inner peripheral face of the shell 3. In the meantime, this sliding member 16 has a pressure communicating portion (not shown), which prevents the pressure flow-in chamber 9 from being separated into a space 9a on the side of an outer periphery of the bellows 6 and a space 9b below the end member 9a in the same Figure by the sliding member 16.

The chamber forming member (called seal plate also) 17 is fixed on the inner side of the end wall portion 3a of the shell 3 and the port member 31 inside the housing 2 and a chamber 18 and a constriction (called nozzle or orifice also) 19 are provided among the chamber forming member 17, the end wall portion 3a of the shell 3 and the port member 31.

The chamber forming member 17 is provided with an elastic seal (called first elastic seal) 20 which the end member 7 of the operating member 5 contacts or leaves and the chamber forming member 17 is provided with the second elastic seal 33 which seals the space between the chamber forming member 17 and the shell 3.

The chamber forming member 17 is formed of a predetermined metal to an annular shape and composed of an inner cylindrical portion 17a, an inner flat portion 17b which is formed integrally from an end portion of this inner cylindrical portion 17a on the side of the end wall portion 3a, an outer cylindrical portion 17c which is formed integrally from an outer peripheral end portion of the inner flat portion 17b toward the end member 7, an annular outer flat portion 17d which is formed integrally from an end portion of the outer cylindrical portion 17c on the side of the end member 7 outward in the diameter direction and a third cylindrical portion 17f which is formed integrally from an outer peripheral end portion of the outer flat portion 17d toward the end wall portion 3a. This chamber forming member 17 is fixed to the shell 3 such that the bottom face of the inner flat portion 17b and the bottom end face of the third cylindrical portion 17f are made in contact with inner faces of the port member 31 and the end wall portion 3a. The fixing structure will be described later. A space on the side of the inner periphery of the inner cylindrical portion 17a acts as a communicating portion 21 which communicates between the pressure flow-in chamber 9 and the fluid inlet 15.

The chamber 18 is formed as an annular space defined by the outer cylindrical portion 17c, the outer flat portion 17d and the third cylindrical portion 17f of the chamber forming member 17, the end wall portion 3a of the shell 3 and the port member 31 (chamber volume: for example, 8 cc).

The constriction 19 is provided in the inner face of the port member 31 in the form of a groove or notch so as to secure communication between the fluid inlet 15 and the chamber 18 and a predetermined number thereof are provided radially (for example, distributed equally in four directions, width: 3 mm, depth: 1.5 mm).

The elastic seal 20 is composed of a lip-like inner peripheral seal (called first seal also) 22 and an outer peripheral seal (called second seal also) 23, formed of predetermined rubber-like elastic material and both seals 22, 23 are constructed in the following way.

First, the inner peripheral seal 22 is bonded by vulcanization to inner faces of the annular space 17e surrounded by the inner cylindrical portion 17a, the inner flat portion 17b and the outer cylindrical portion 17c of the chamber forming member 17 and has a double-structure lip end 22a which the end member 7 of the operating member 5 contacts or leaves when it is operated.

The outer peripheral seal 23 is bonded by vulcanization to an end face of the outer flat portion 17 on the side of the end member 7 of the chamber forming member 17 and has a double structure lip end 23a which the end member 7 of the operating member 5 contacts or leaves when it is operated.

The second elastic seal 33 is composed of combination of a lip-like third seal 34 and fourth seal (called outer peripheral rubber portion also) 35 formed of a predetermined rubber-like elastic material and both seals 34, 35 are constructed in the following way.

The third seal 34 is bonded by vulcanization on an outer peripheral edge of an end face on the side of the end member 7 of the outer flat portion 17d of the chamber forming member 17 and has a lip end which always makes contact with an inner face of a peripheral wall portion 3d of the shell 3.

The fourth seal 35 is bonded by vulcanization on the outer peripheral face of the third cylindrical portion 17f of the chamber forming member 17 and has a lip end which always makes contact with the inner face of the peripheral wall portion 3d of the shell 3. In the elastic seal 20 and the second elastic seal 33, the inner peripheral seal 22 and the outer peripheral seal 23 are formed integrally through the film portion 25, and the outer peripheral seal 23 and the third seal 34 are formed integrally through the film portion 36. Further, the third seal 34 and the fourth seal 35 are also formed integrally through the film portion 37. Thus, all of the inner peripheral seal 22, the outer peripheral seal 23, the third seal 34 and the fourth seal 35 are formed integrally, so that the elastic seal 20 and the second elastic seal 33 are also formed integrally.

The chamber forming member 17 on which the elastic seal 20 and the second elastic seal 33 are bonded by vulcanization are pressed into the inside of the shell 3. The chamber forming member 17 is fixed to the inside of the peripheral wall portion 3d of the shell 3 by a pressed distance produced by compressing the fourth seal 35 of the second elastic seal 33 bonded by vulcanization to the outer peripheral face of the third cylindrical portion 17f in the diameter direction. Further, the following fixing structure is provided to prevent the chamber forming member 17 after fixed from floating from the end wall portion 3a of the shell 3 and the port member 31 because of a differential pressure produced in the constriction 19.

That is, a cylindrical insertion fixing portion 40, which is to be inserted along the inner periphery of the inner cylindrical portion 17a of the chamber forming member 17, is formed integrally on a top face of the port member 31 of the housing 2 such that it faces upward. The inner cylindrical portion 17a of the chamber forming member 17 is fit to the outer periphery of this cylindrical insertion fixing portion 40 over a predetermined fitting distance. Although this fitting is performed relatively strong between one and another metals, it may be reinforced by caulking to expand the tube as required.

The cylindrical insertion fixing portion 40 has a notch communicating portion 41 for securing communication between the a space produced by the inner periphery and each constriction 19 to match the allocation of each constriction 19 (for example, distributed equally in four directions). Thus, the top end portion of the cylindrical insertion fixing portion 40 is divided in the circumferential direction by notch communicating portions 41 and deforming each divided piece plastically outward in the diameter direction as if it is pressed upward after the fitting enables the fitting force to be increased.

If pressure fluid with vibration on the system side flows into the accumulator having the above described structure, when this fluid or its pressure passes or propagates through the constriction 19, vibration energy is converted to loss energy due to contracted flow/throttling. Further, when fluid reaches the chamber 18, it is used and consumed as dynamic loss. Therefore, vibration such as the aforementioned noise can be suppressed by the vibration damping action by the chamber 18 and the constriction 19.

The chamber 18 and the constriction 19 are not the operating members 5 unlike in the aforementioned conventional technology and are provided between the chamber forming member 17 fixed inside the shell 3 of the housing 2 and the end wall portion 3a of the shell 3. Therefore, a bellows 6 having as large a volume as in the conventional technology does not need to be used. To define the shell 18, the entire inner diameter of the shell 3 can be used as shown in the Figure and thus, the heights of the shell 3 and the housing 2 can be suppressed to relatively small ones. For the reason, the entire accumulator 1 can be formed smaller than in the conventional technology.

Further, the chamber forming member 17 is fixed to the shell 3 of the housing 2 not by welding but by caulking unlike in the conventional technology. Thus, the welded portions in the accumulator 1 do not increase although the accumulator 1 is provided additionally with the chamber forming member 17. Thus, the accumulator 1 can be manufactured more easily than in the conventional technology.

Because the elastic seal 20 which the operating member 5 contacts or leaves when it is operated is provided on the chamber forming member 17, even if the pressure in the pressure flow-in chamber 9 or the pressure on the system side drops below a charged gas pressure when the accumulator 1 is actuated, the pressure of the pressure flow-in chamber 9 can be maintained over a predetermined value by the sealing action of the elastic seal 17. Thus, the bellows 6 can be prevented from being expanded or damaged due to a difference in pressure between the inside and the outside (if a pressure within the pressure flow-in chamber 9 drops, the operating member 5 is operated, so that the end member 7 makes a firm contact with the inner peripheral seal 22 and the outer peripheral seal 23 thereby sealing each portion. Consequently, the pressure flow-in chamber 9 and the pressure sealing chamber 8, which are formed by partitioning to the inside and outside chambers by outer peripheral seal 23 are balanced, thereby protecting the bellows 6 from being damaged). The elastic seal 20 ensures high safety and reliability because it is composed of the inner peripheral seal and the outer peripheral seal so that a double structure is formed. Further, because this elastic seal 20 is formed integrally with the chamber forming member 17 by vulcanization, the chamber forming member 17 and the elastic seal 20 can be handled as a single component.

Because such three components as the shell 3 which forms the housing 2, the end member 4 and the bellows holder 32 which holds the bellows 6 are assembled together by welding, the welding operation can be achieved all at once, thereby leading to facilitation of the assembly work.

The cylindrical insertion fixing portion 40 and its fixing structure may be as follows.

Seventh Embodiment

As shown in FIG. 10, a protrusion 42 is provided on an outer peripheral face of a front end portion (top end portion) of the cylindrical insertion fixing portion 40 in the diameter direction. Then, the chamber forming member 17 is protected from loosening by pressing this protrusion 42 against an inner peripheral face of the inner cylindrical portion 17a of the chamber forming member 17 as shown in FIG. 11.

Eighth Embodiment

As shown in FIG. 12, a wedge-like hook 43 is provided on an outer peripheral face of a front end portion (top end portion) of the cylindrical insertion fixing portion 40 such that it is projected outward in the diameter direction. Then, the chamber forming member 17 is protected from loosening by pressing this wedge-like hook 43 against an inner peripheral face of the inner cylindrical portion 17a of the chamber forming member 17.

Ninth Embodiment

As shown in FIG. 14, the protrusion or wedge-like hook (wedge-like hook 43 in the same Figure) is provided on the outer peripheral face of this cylindrical insertion fixing portion 40 such that it is projected outward in the diameter direction and a step-like engaging portion 44 is provided in the inner peripheral face of the inner cylindrical portion 17a of the chamber forming member 17. Consequently, the chamber forming member 17 is protected from loosening by engaging the protrusion or wedge-like hook 43 with the step-like engaging portion 44.

Tenth Embodiment

As shown in FIG. 15, the front end portion (top end portion) of the cylindrical insertion fixing portion 40 is formed higher than the front end portion (top end portion) of the inner cylindrical portion 17a of the chamber forming member 17 and further, the protrusion or wedge-like hook (wedge-like hook 43 in the same Figure) is provided on the outer peripheral face of this cylindrical insertion fixing portion 40 such that it is projected outward in the diameter direction. Consequently, the chamber forming member 17 is protected from loosening by engaging the protrusion or wedge-like hook 43 with the front end portion of the inner cylindrical portion 17a.

Eleventh Embodiment

As shown in FIG. 16A, the front end portion (top end portion) of the cylindrical insertion fixing portion 40 is formed higher than the front end portion (top end portion) of the inner cylindrical portion 17a of the chamber forming member 17. Then, the chamber forming member 17 is fit into an outer periphery of the insertion fixing portion 40 and after it is inserted, a front end portion 40a of the insertion fixing portion 40 is bent outward in the diameter direction as shown in FIG. 16B so as to press the inner cylindrical portion 17a of the chamber forming member 17, thereby protecting the chamber forming member from loosening. Other deforming method such as caulking, crushing is permitted instead of bending and the initial inserting condition may be a loose fitting condition. The feature of this proposal exist in a structure for protecting the seal plate 17 from loosening by bending the top end face of the oil port 31 (bending part of a front end (top portion) of the oil port 31) and pressing the seal plate 17 from above in order to prevent the seal plate 17 from loosening upward due to a differential pressure and vibration. Its loosening stopper portion is provided when the oil plate 31 is manufactured by cold forging, and consequently, loosening stoppage effect is achieved without increasing the quantity of necessary components.

As regards the sixth embodiment to the eleventh embodiment, the details of respective components are as follows.

(1) Shell 3: High tension drawn material, drawing example of material: SPFH-590

(2) Lid member 4: High tension drawn material, drawing example of material: SPFH-590

(3) Plug member 11: Cold rolled material, drawing example of material: SPCE, SPCC (4) Bellows assembly Metallic bellows 6: Example of material: SUS Bellows holder 32: Example of material: SUS End member 7: Example of material: SUS These components are integrated by welding.

(5) Port member 31: Cold forged product

Example of material: S15C (6) Application

Adopted for automobile brake system, suspension system, compensation for system pump capacity, damping of pulse (7) Example of operation $N_2$ gas: pilot pressure 100 kg/cm$^3$ Operating pressure: oil pressure 150 to 200 kg/cm$^3$

EFFECT OF THE PRESENT INVENTION

The present invention exerts the following effects.

Because the accumulator 1 according to claim 1 of the present invention having the above-described structure has the chamber and the constriction within its housing, the aforementioned hydraulic noise can be suppressed by this chamber, constriction and vibration damping action. Further, because this chamber and constriction are not operating members unlike in the conventional technology but exist between the chamber forming member fixed inside the housing and the end wall portion of the housing provided with the fluid inlet, a bellows having as large a volume as in the conventional technology does not need to be employed. Therefore, the accumulator can be formed smaller.

Additionally, because in the accumulator according to claim 2 of the present invention, the chamber forming member is fixed to the housing not by welding unlike in the conventional technology but by non-welding means such as fitting, press-fitting, caulking, the quantity of its welded portions does not increase even if the chamber is provided in the housing. Therefore, the accumulator can be manufactured easily.

Further, because in the accumulator according to claim 3 of the present invention, the chamber forming member is fixed to the housing not by welding unlike in the conventional technology but by the convex loosening stopper engaging portion provided on the inner face of the housing, the quantity of its welded portions does not increase even if the chamber is provided within the housing. Therefore, the accumulator can be manufactured easily.

Further, because in the accumulator according to claim 4 of the present invention, the chamber forming member is fixed to the housing not by welding unlike in the conventional technology but by such a loosening stoppage member as the stopper ring fixed on the inner face of the housing, the quantity of its welded portions does not increase even if the chamber is provided within the housing. Therefore, the accumulator can be manufacture easily.

Further, because in the accumulator according to claim 5 of the present invention, the chamber forming member is fixed to the housing not by welding unlike in the conventional technology but by inserting the chamber forming member into the outer periphery of the insertion fixing portion provided on the housing, the quantity of its welded portions does not increase even if the chamber is provided within the housing. Therefore, the accumulator can be manufactured easily.

Further, because the chamber forming member is fixed to the housing substantially in the center of its plane, the chamber forming member can be prevented from floating from the housing due to a difference in pressure generated in the constriction.

Further, because in the accumulator according to claim 6 of the present invention, the chamber forming member is fixed to the housing not by welding but by inserting the chamber forming member to the outer periphery of the insertion fixing portion provided on the housing and after the insertion, deforming the front end portion of the insertion fixing portion by bending, caulking, crushing or the like, the quantity of its welded portions does not increase even if the chamber is provided within the housing. Therefore, the accumulator can be manufactured easily.

Further, because the chamber forming member is fixed to the housing substantially in the center of its plane, the chamber forming member can be prevented from floating from the housing due to a difference in pressure or the like generated in the constriction.

Further, because in the accumulator according to claim 7 of the present invention, the chamber forming member is provided with the elastic seal which the operating member contacts or leaves when it is operated, the sealing action of this elastic seal can maintain the pressure in the pressure flow-in chamber over a predetermined value even if the pressure in the pressure flow-in chamber or the pressure on the system side drops below the sealing gas pressure. Therefore, when the system pressure drops below the charged gas pressure, the bellows can be prevented from being expanded and damaged due to a difference in pressure between the inside and the outside.

Further, because in the accumulator according to claim 8 of the present invention having the above-described structure, the three components, namely, the shell forming the housing, the end member and the bellows holder holding the bellows are assembled together by welding, the welding operation for these components can be achieved all at once, thereby leading to facilitation of the assembly work.

BRIEF DESCRIPTION OF THE DRAWINGS

FIG. 16(A) is a sectional view showing a condition before the front end of the insertion fixing portion is deformed.

FIG. 16(B) is a sectional view showing a condition after the front end of the insertion fixing portion is deformed.

DESCRIPTION OF REFERENCE NUMERALS

Figure 1:
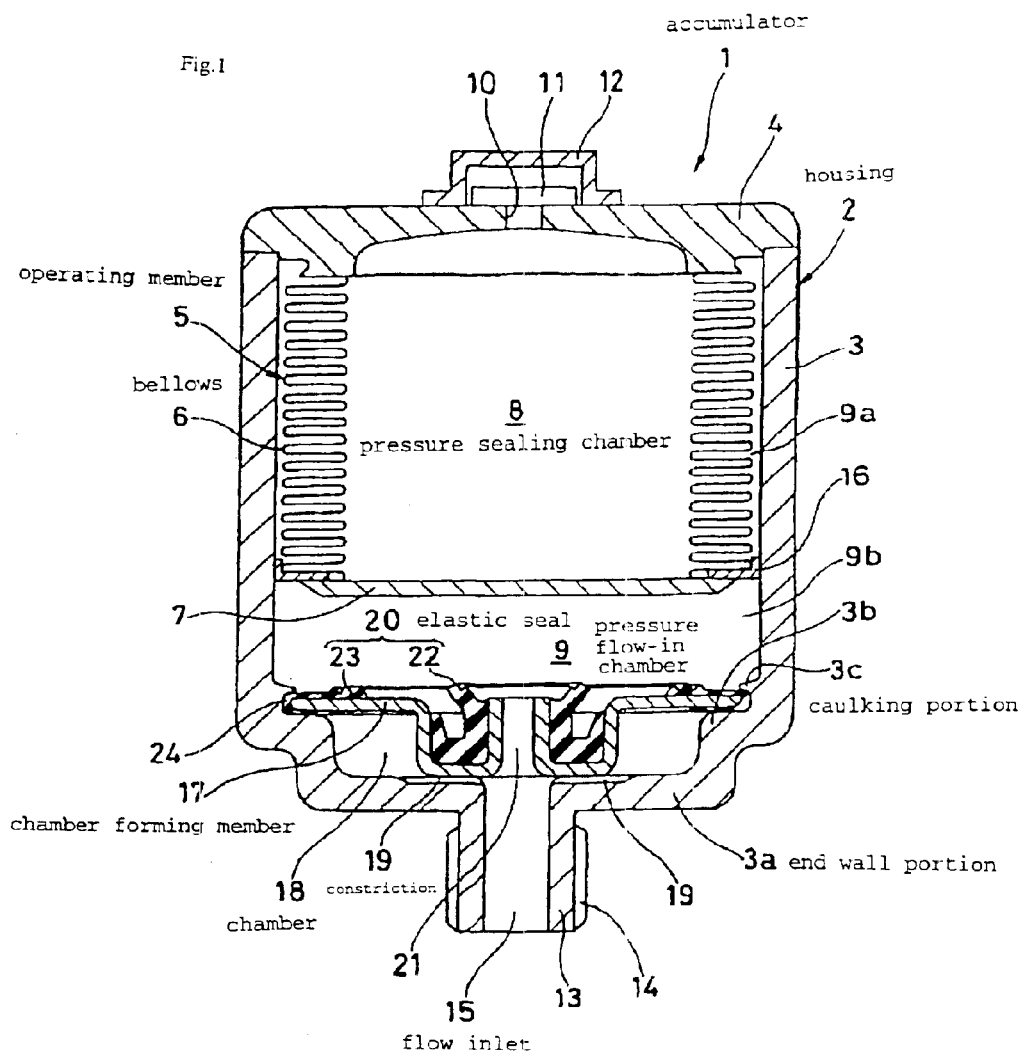
FIG. 1 is a sectional view of the accumulator according to the first embodiment of the present invention.
Figure 2:
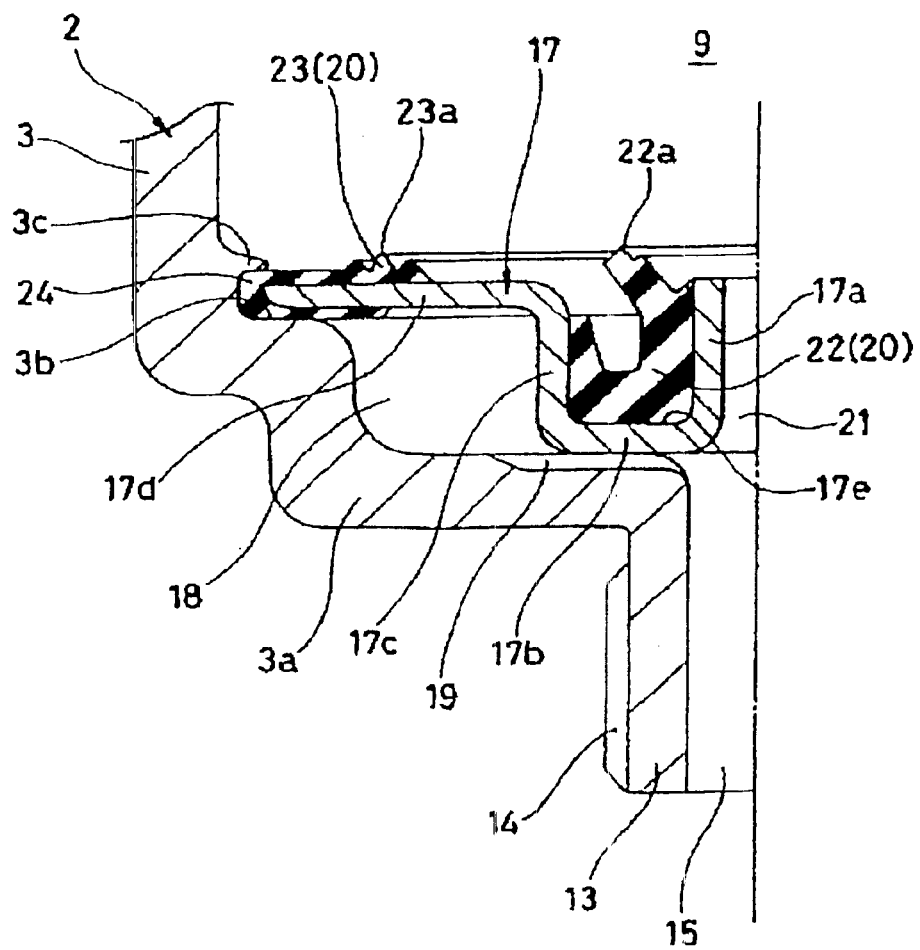
FIG. 2 is an enlargement diagram of major components of FIG. 1.
Figure 3:
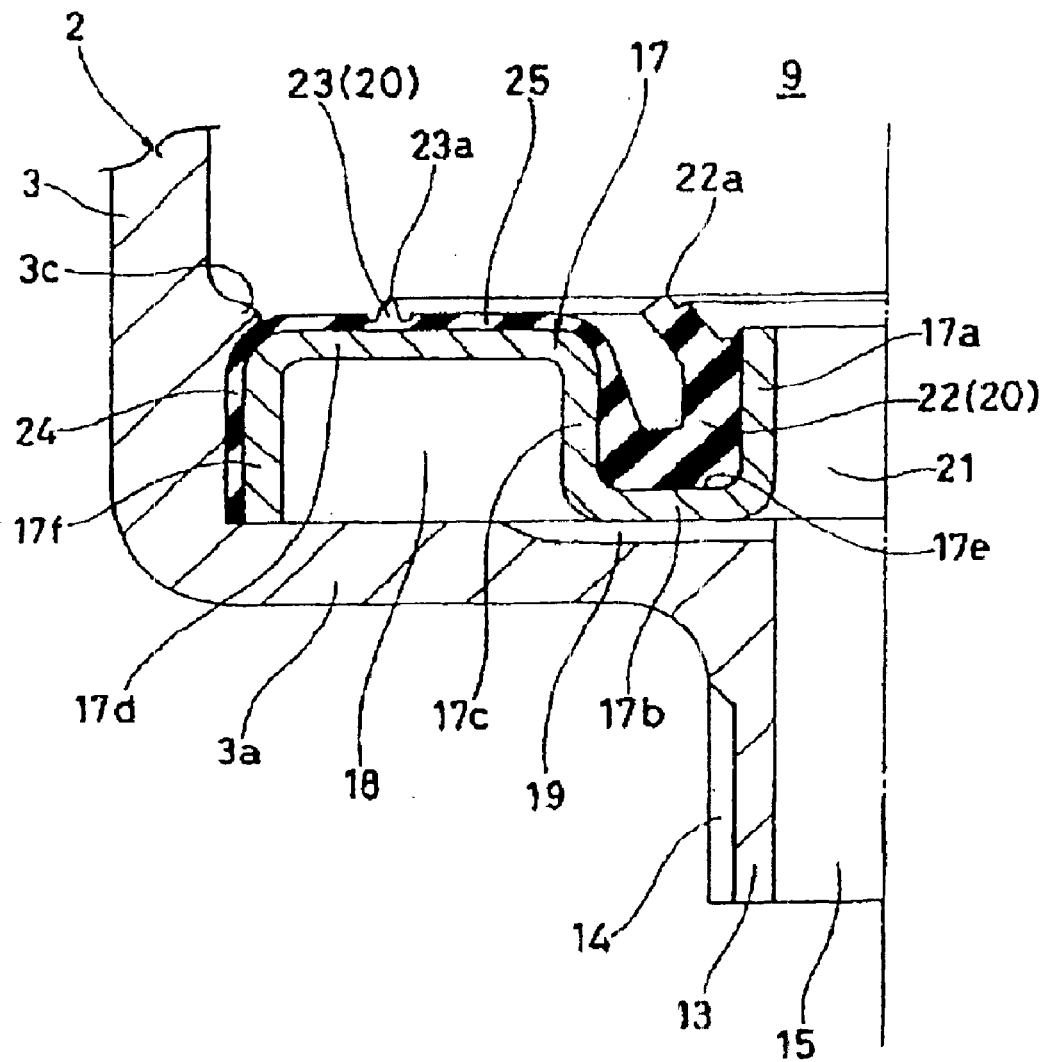
FIG. 3 is a sectional view of the major components of the accumulator according to the second embodiment of the present invention.
Figure 4:
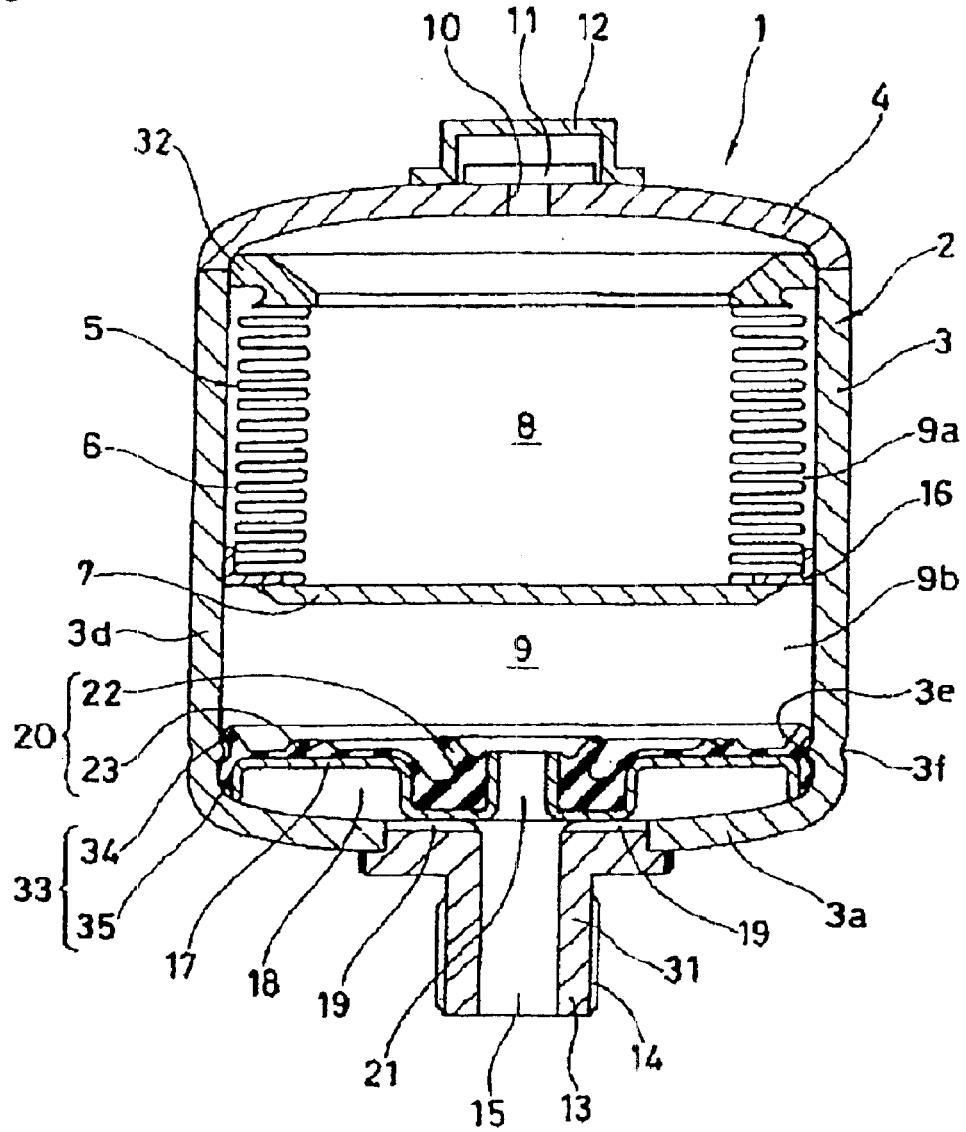
FIG. 4 is a sectional view of the accumulator according to the third embodiment of the present invention.
Figure 5:
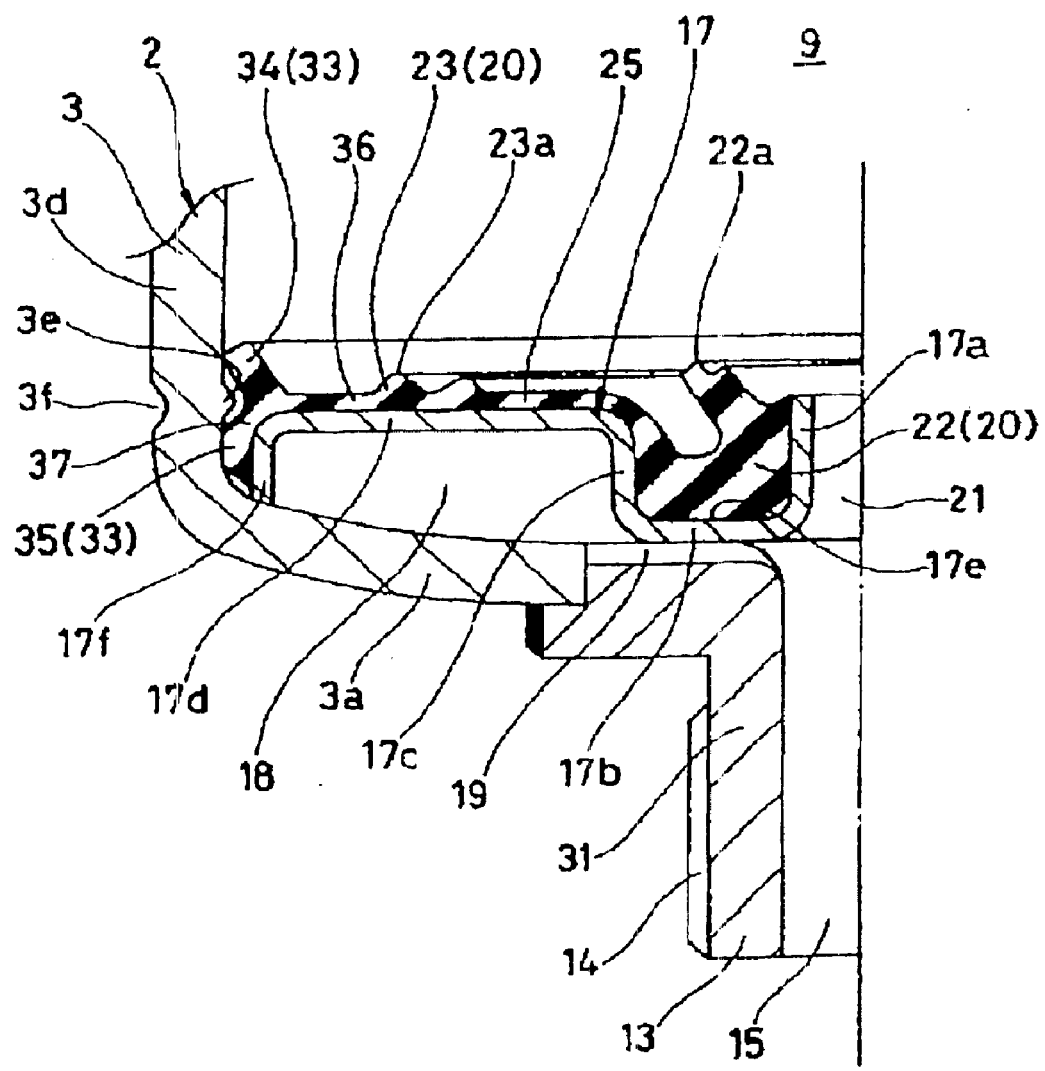
FIG. 5 is an enlargement diagram of major components of FIG. 4.
Figure 6:
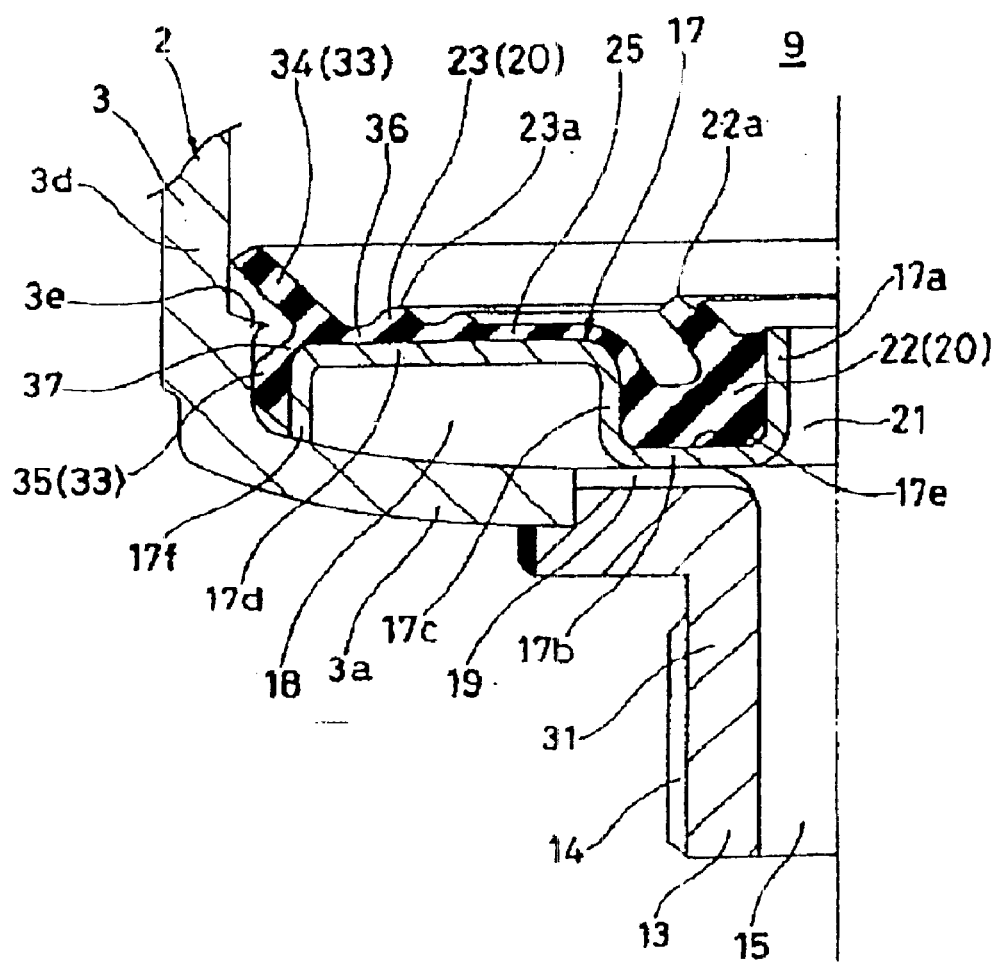
FIG. 6 is a sectional view of major components of the accumulator according to the fourth embodiment of the present invention.
Figure 7:
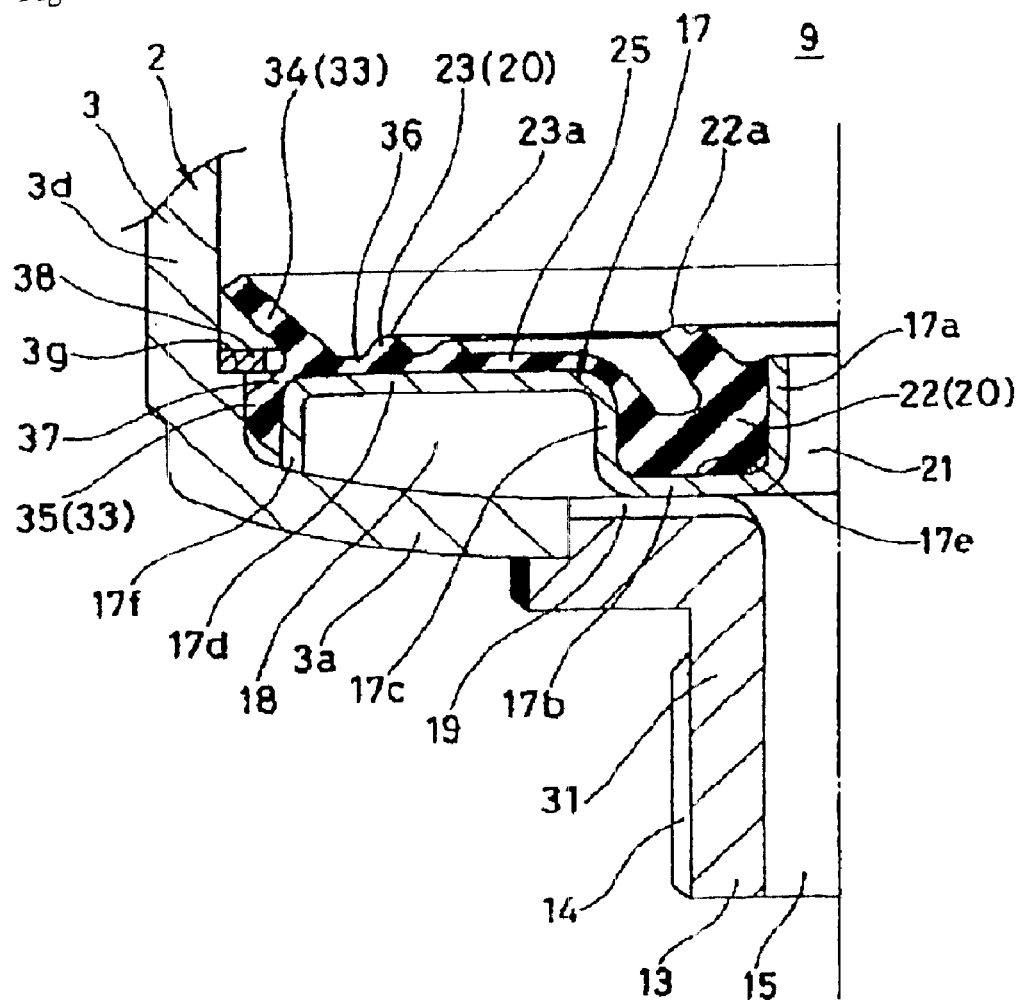
FIG. 7 is a sectional view of major components of the accumulator according to the fifth embodiment of the present invention.
Figure 8:
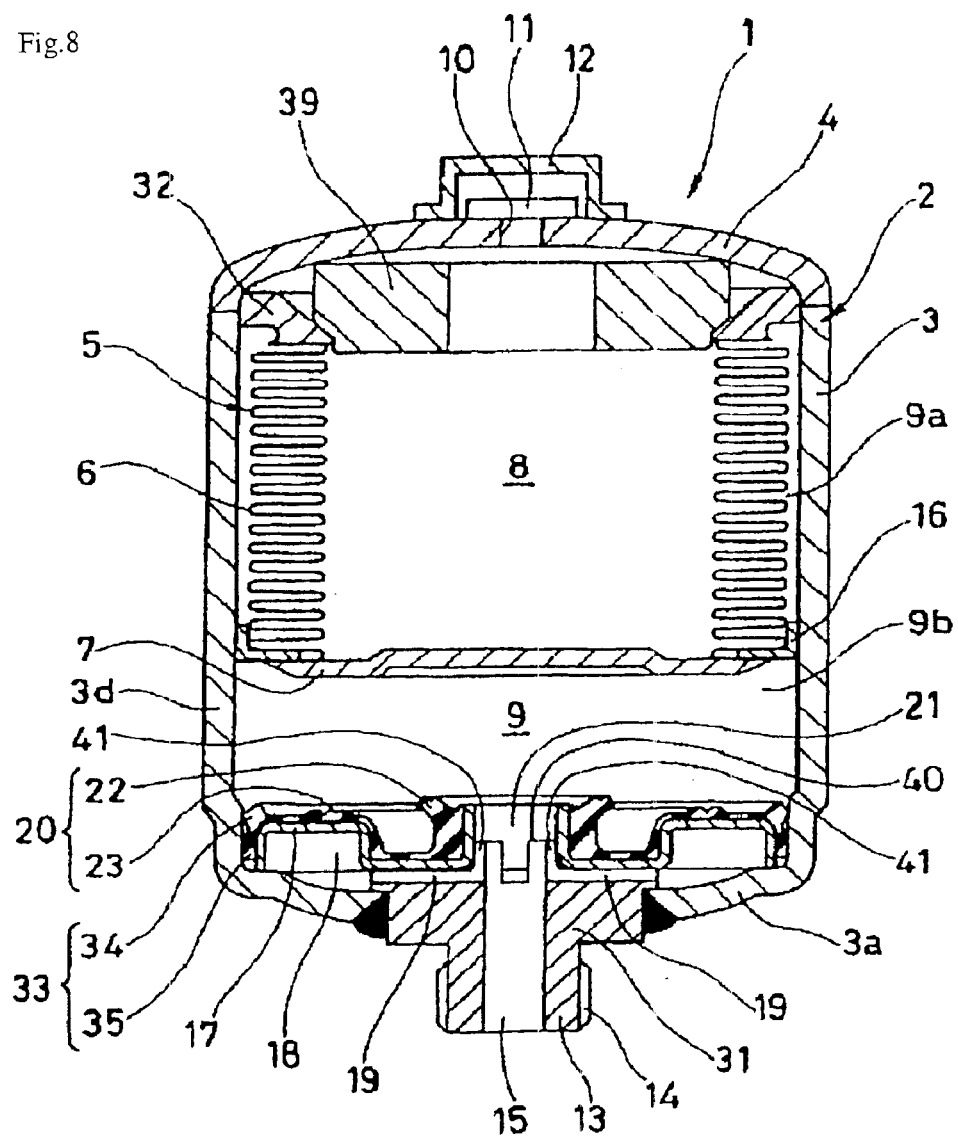
FIG. 8 is a sectional view of the accumulator according to the sixth embodiment of the present invention.
Figure 9:
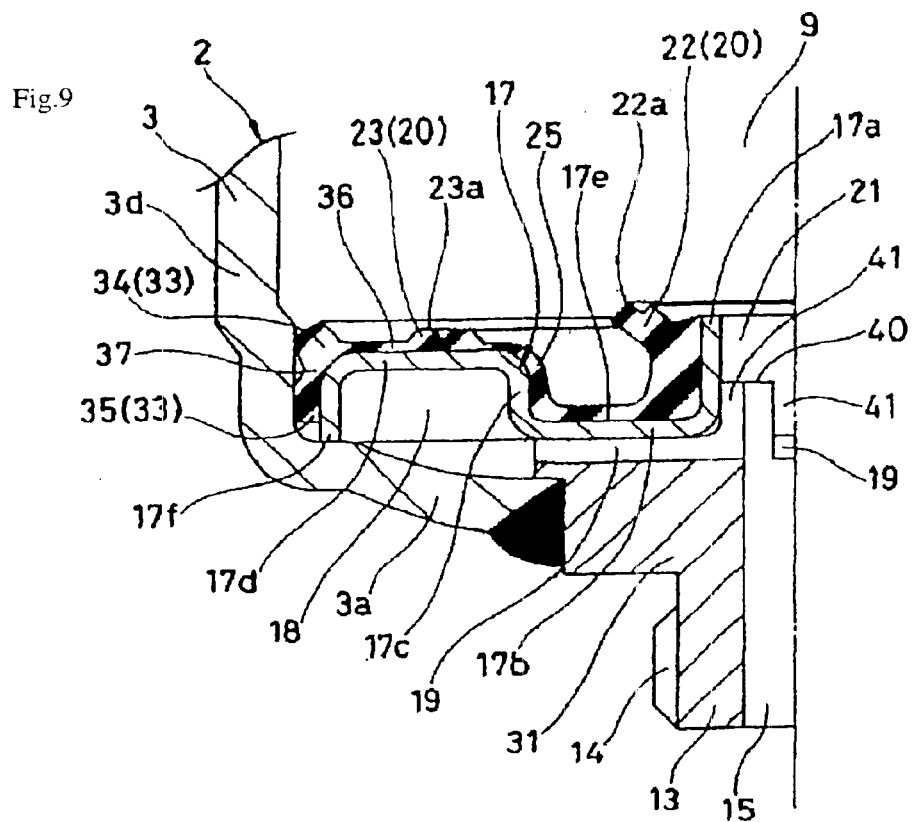
FIG. 9 is an enlargement diagram of major components of FIG. 8.
Figure 10:
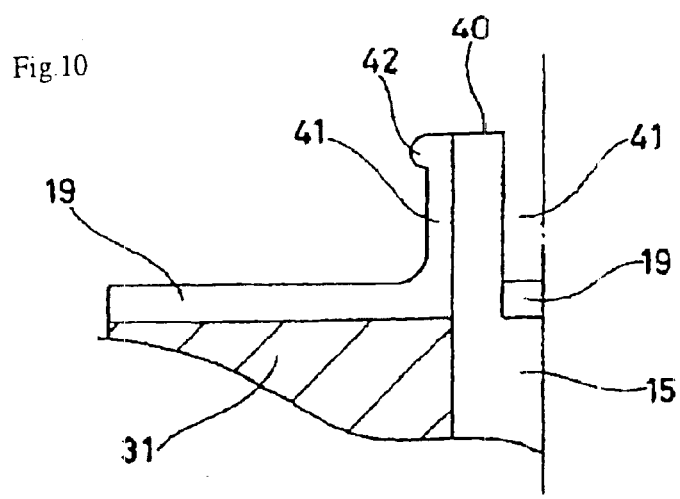
FIG. 10 is a sectional view of the insertion fixing portion of the accumulator according to the seventh embodiment of the present invention.
Figure 11:
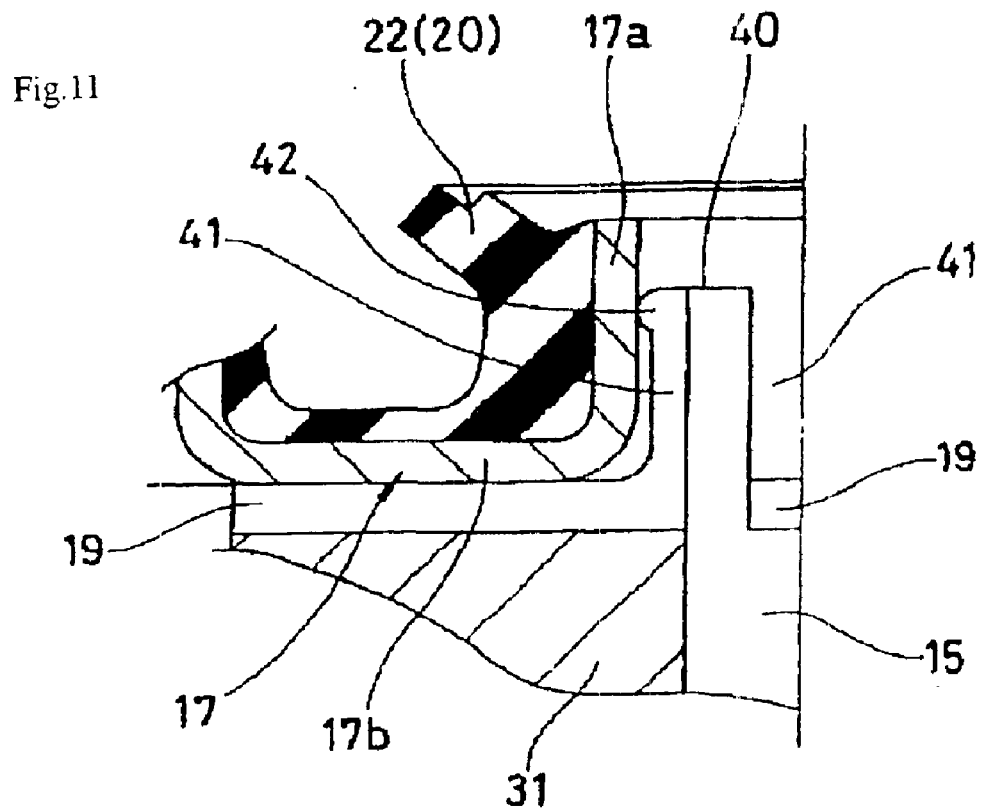
FIG. 11 is a sectional view of a condition in which the chamber forming member is fit to the outer periphery of the same insertion fixing portion.
Figure 12:
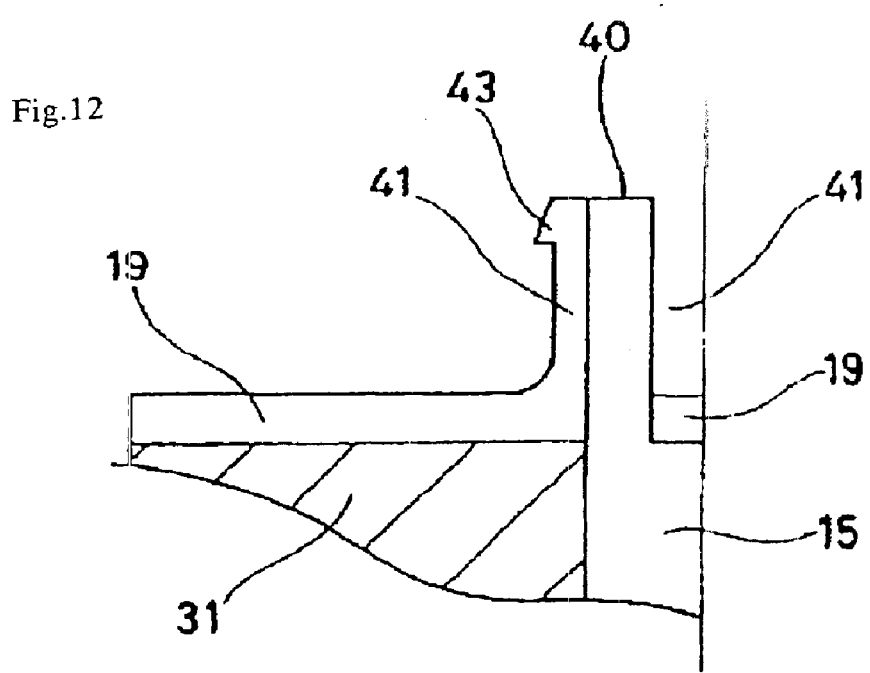
FIG. 12 is a sectional view of the insertion fixing portion in the accumulator according to the eighth embodiment of the present invention.
Figure 13:
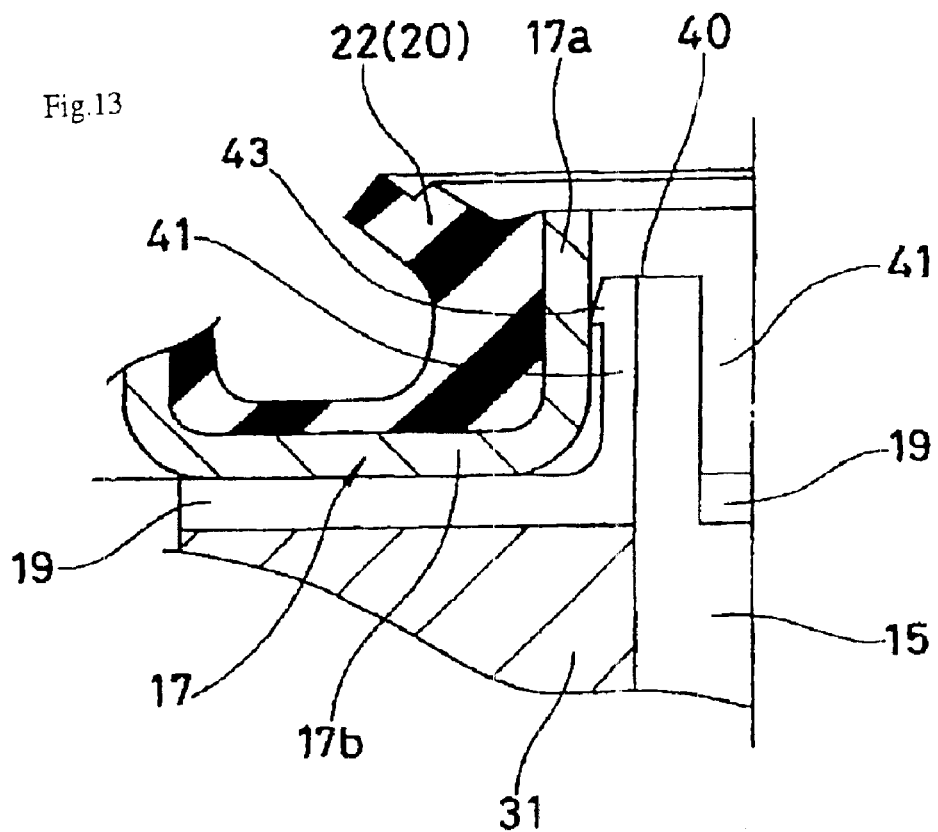
FIG. 13 is a sectional view of a condition in which the chamber forming member is fit to the outer periphery of the same insertion fixing portion.
Figure 14:
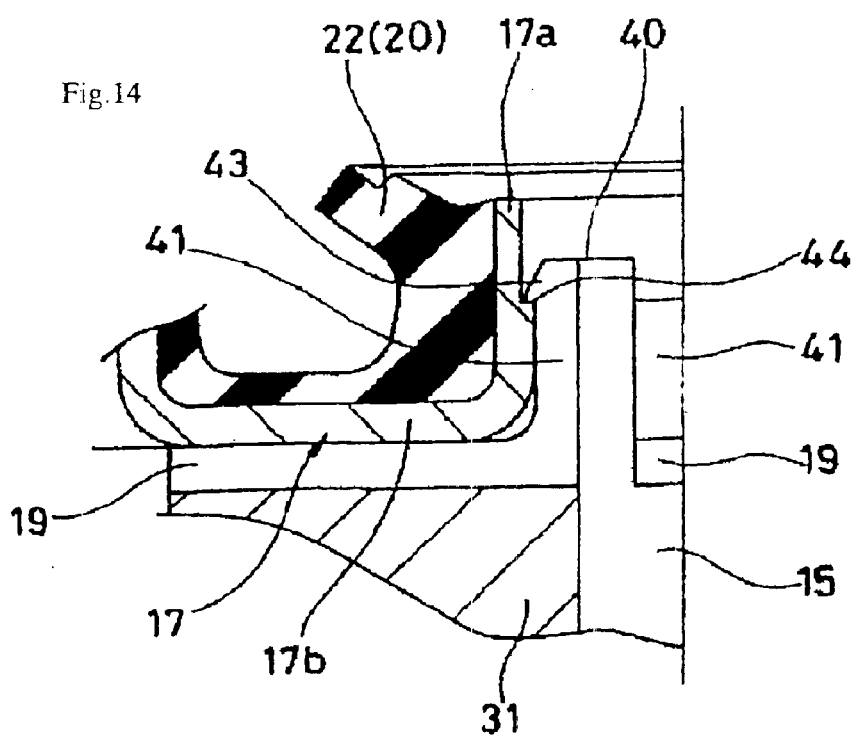
FIG. 14 is a sectional view of major components of the accumulator according to the ninth embodiment of the present invention.
Figure 15:
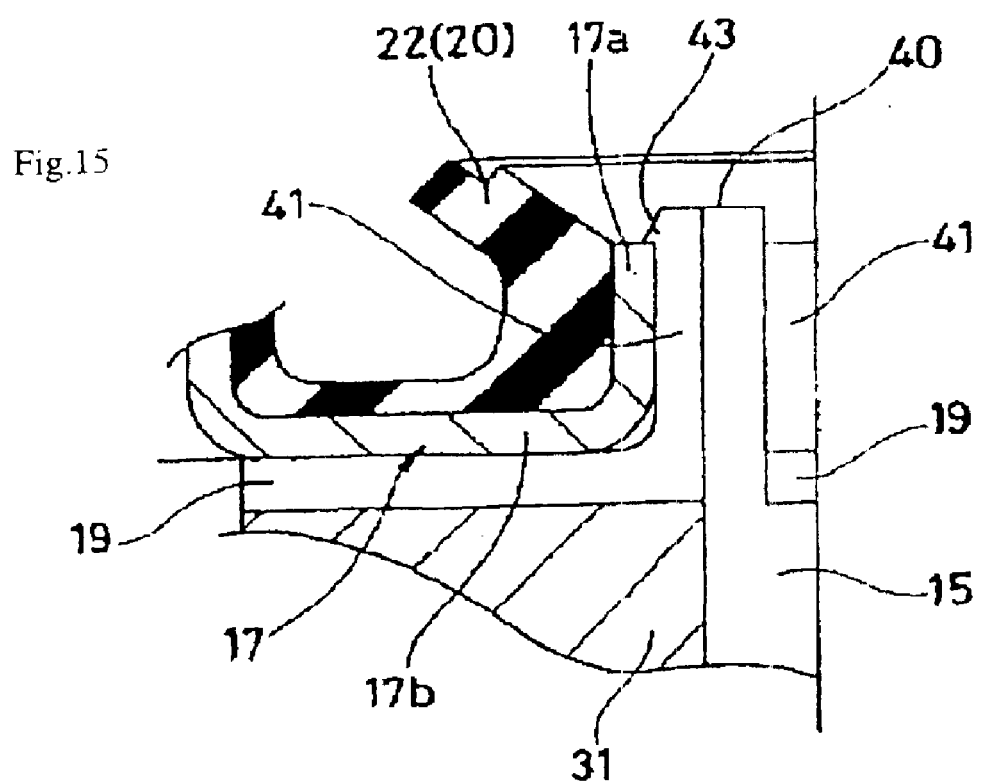
FIG. 15 is a sectional view of major components of the accumulator according to the tenth embodiment of the present invention.
Figure 16:
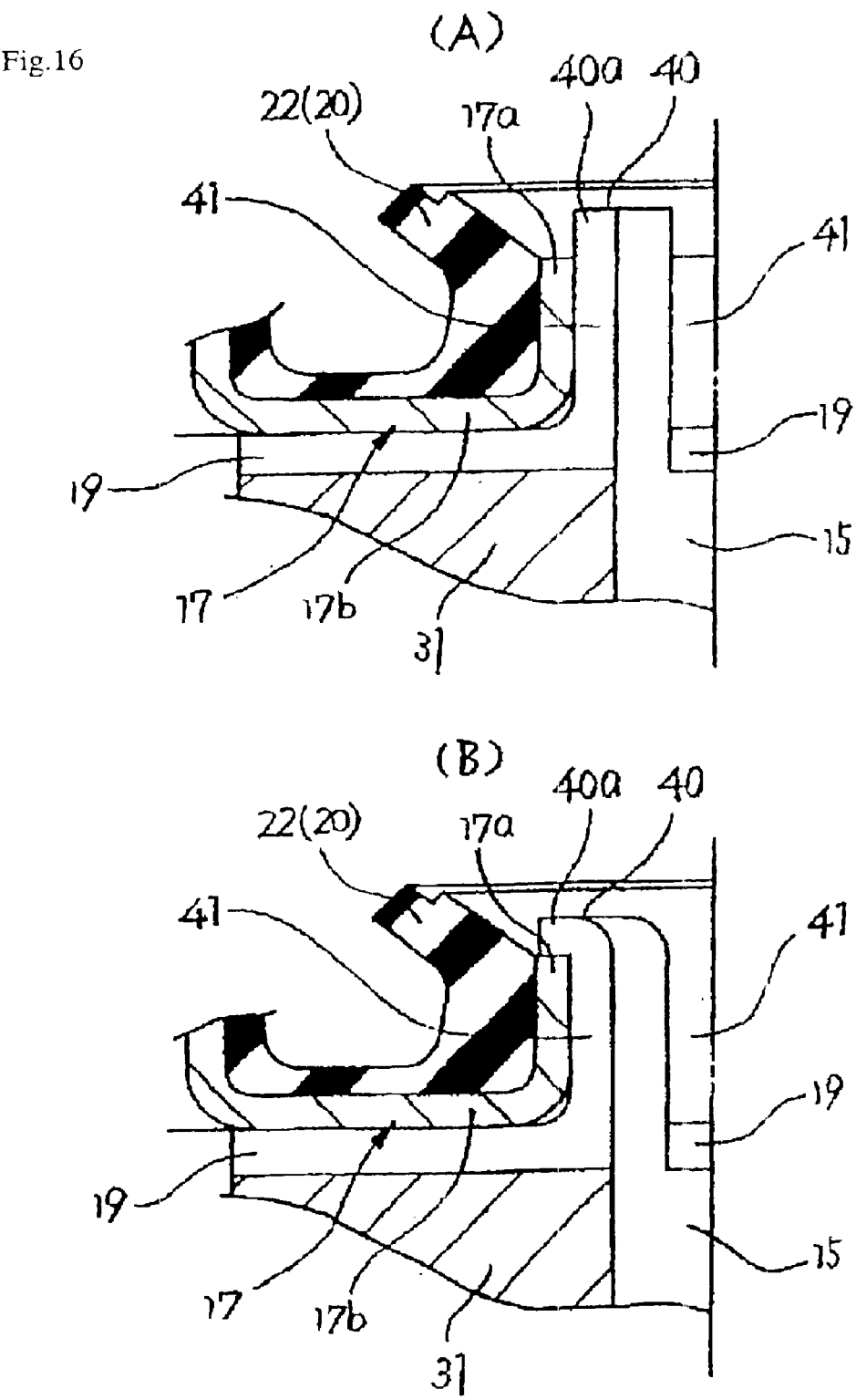
FIG. 16 is a sectional view of major components according to the eleventh embodiment of the present invention.
Figure 17:
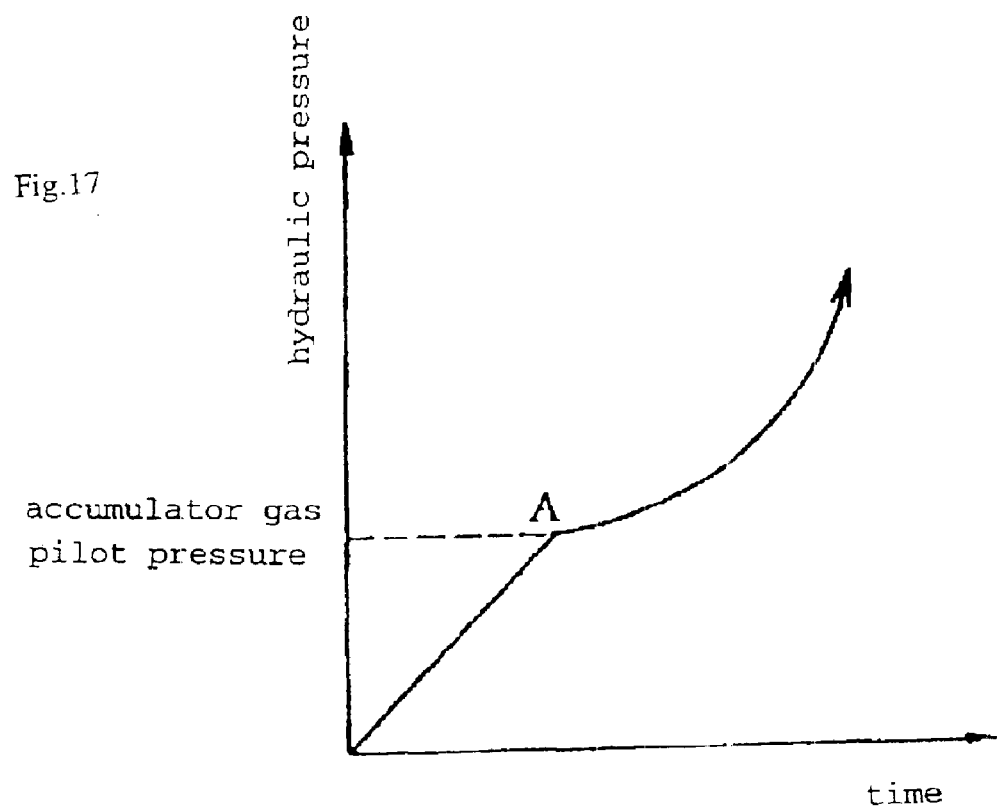
FIG. 17 is a graph showing the general operating characteristic of the accumulator.
Figure 18:
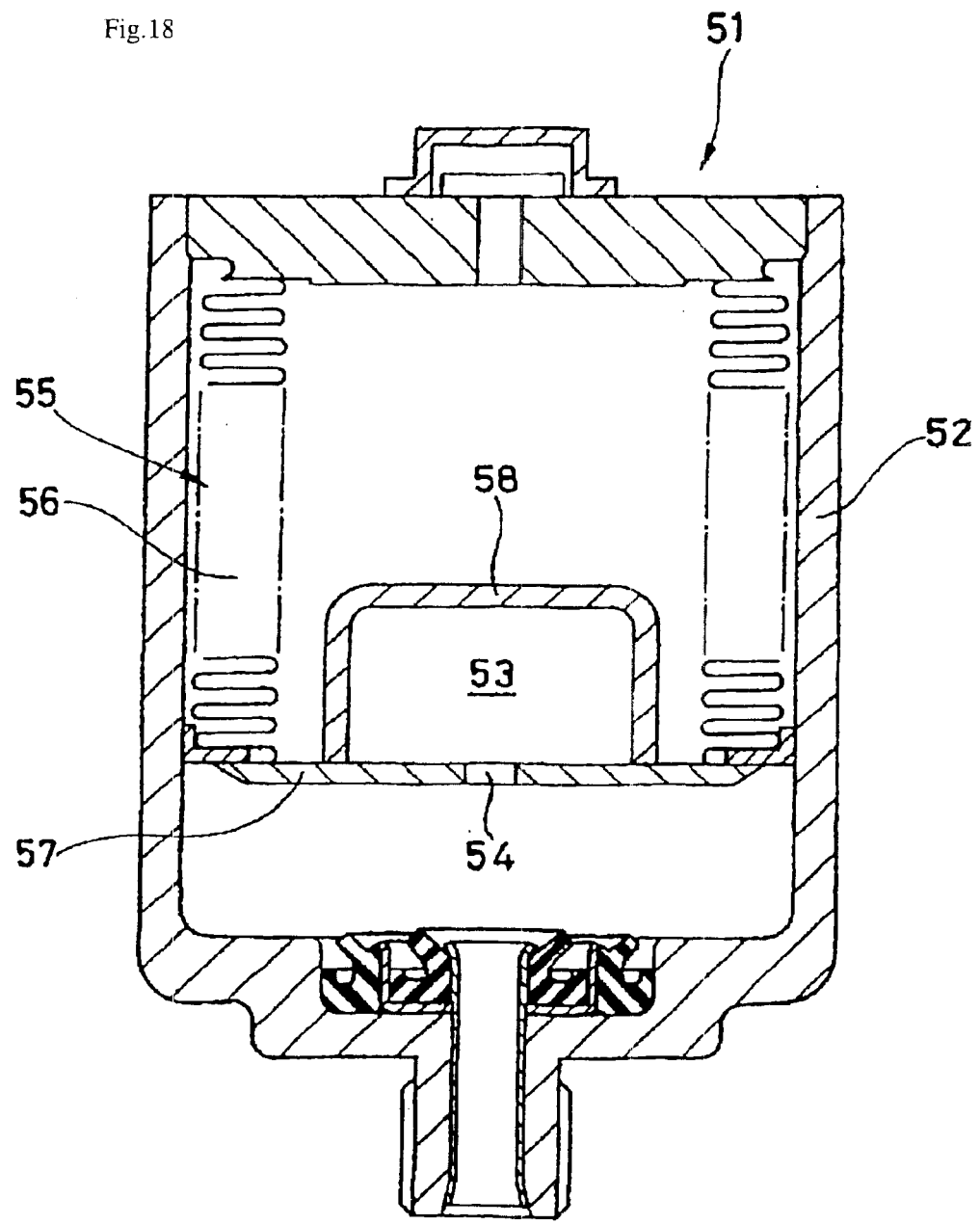
FIG. 18 is a sectional view of a conventional accumulator.

1: accumulator
2: housing
3: shell
3a: end wall portion
3b, 3g: step portion
3c: caulking portion
3d: peripheral wall portion
3e: loosening stopper engaging portion
3f: concave portion
4: lid member
5: operating member
6: bellows
7: end member
8: pressure sealing chamber
9: pressure flow-in chamber
10: pressure flow-in port
11: plug member
12: hexagon nut
13: mounting portion
14: thread portion
15: fluid inlet
16: sliding member
17: chamber forming member
17a: inner cylindrical portion
17b: inner flat portion
17c: outer cylindrical portion
17d: outer flat portion
17e: space
17f: third cylindrical portion
18: chamber
19: constriction
20: elastic seal
21, 41: communicating portion
22: inner peripheral seal
23: outer peripheral seal
24, 25, 36, 37: film portion
31: port member
32: bellows holder
33: second elastic seal
34: third seal
35: fourth seal
38: stopper ring (loosening stopper member)
39: spacer
40: insertion fixing portion
40a: front end portion
42: protrusion
43: hook
44: engaging portion

What is claimed is:

1. An accumulator, comprising:

an operating member (5) including a bellows (6), disposed inside a housing (2) to partition the interior of the housing (2) into a pressure sealing chamber (8) and a pressure flow-in chamber (9), while an end wall portion (3a) of the housing (2) is provided with a fluid inlet (15) for introducing a pressurized fluid from the system side into the pressure flow-in chamber (9), and a chamber forming member (17) being fixed inside the housing (2) so that a chamber (18) and a constriction (19) are provided between the chamber forming member (17) and an end wall portion (3a) of the housing (2).

2. The accumulator according to claim 1 wherein the chamber forming member (17) is fixed to the housing (2) by a non-welding means selected from the group comprising fitting, press-fitting, caulking.

3. The accumulator according to claim 1 wherein the chamber forming member (17) is fixed to the housing (2) by a convex loosening stopper portion (3e) provided on an inner face of the housing (2).

4. The accumulator according to claim 1 wherein the chamber forming member (17) is fixed to the housing (2) by such a loosening stopper member (38) as a stopper ring fixed to the inner face of the housing (2).

5. The accumulator according to claim 1 wherein the chamber forming member (17) is fixed to the housing (2) by inserting the chamber forming member (17) to the outer periphery of an insertion fixing portion (40) provided on the housing (2).

6. The accumulator according to claim 1 wherein the chamber forming member (17) is fixed to the housing (2) by inserting the chamber forming member (17) to the outer periphery of the insertion fixing portion (40) provided on the housing (2) and deforming a front end portion of the insertion fixing portion (40) after the insertion.

7. The accumulator according to either one of claims 1 to 6 wherein the chamber forming member (17) is provided with an elastic seal (20) which the operating member (5) contacts or leaves when it is operated.

8. The accumulator according to claim 7 wherein three components, namely, a shell (3) forming the housing (2), an end member (4) and a bellows holder (32) holding the bellows (6) are assembled together by welding.

* * * * *